United States Patent [19]
Morningstar et al.

[11] Patent Number: 6,145,013
[45] Date of Patent: Nov. 7, 2000

[54] DISTRIBUTED INSTANTIATION SYSTEM AND METHOD

[75] Inventors: Chip Morningstar; F. Randall Farmer, both of Palo Alto, Calif.

[73] Assignee: Communities.com, Cupertino, Calif.

[21] Appl. No.: 08/811,756

[22] Filed: Mar. 6, 1997

Related U.S. Application Data

[63] Continuation-in-part of application No. 08/628,894, Apr. 9, 1996.

[51] Int. Cl.[7] ........................................................ G06F 9/46
[52] U.S. Cl. ................................................................ 709/316
[58] Field of Search .................................... 709/300, 303

[56]  References Cited

U.S. PATENT DOCUMENTS

| | | | |
|---|---|---|---|
| 5,603,031 | 2/1997 | White et al. | 709/303 |
| 5,692,124 | 11/1997 | Holden et al. | 395/187.01 |
| 5,802,178 | 9/1998 | Holden et al. | 380/49 |
| 5,828,832 | 10/1998 | Holden et al. | 395/187.01 |
| 5,872,847 | 2/1999 | Boyle et al. | 380/25 |

OTHER PUBLICATIONS (no author given) ORB 2.0 RFP Submission, OMG TC Document 94.9.32, pp. 1–109, Sep. 1994.
(no author given) "The Common Object Rquest Broker: Architecture and Specification" Digital Equipment Corporation, OMG Document No. 91.12.1 Revision 1.1, pp. 1–177, 1992.

Primary Examiner—Majid A. Banankhah
Assistant Examiner—St.-John Courtenay, III
Attorney, Agent, or Firm—Philip H. Albert; Townsend and Townsend and Crew LLP

[57]  ABSTRACT

A communication system and method includes unums distributed over at least a single presence and including a selected plurality of ingredients. An unum is established by creating ingredients at the level of its interface and attributes; and at the level of its implementation; and interconnecting ingredients into presences and unums. Communication between ingredients is accomplished within a single presence, across an unum boundary within an agency, or within a single unum across a presence boundary. Trust boundaries are established between presences and unums to establish a predetermined level of communications security in messaging between ingredients.

8 Claims, 16 Drawing Sheets

DISTRIBUTED INSTANTIATION SYSTEM AND METHOD

CROSS REFERENCE TO RELATED APPLICATIONS

This application is a continuation-in-part of application Ser. No. 08/628,894 filed Apr. 9, 1996, which is incorporated herein by reference for all purposes.

COPYRIGHT NOTICE

A portion of the disclosure of this patent document contains material which is subject to copyright protection. The copyright owner has no objection to the xerographic reproduction by anyone of the patent document or the patent disclosure in exactly the form it appears in the Patent and Trademark Office patent file or records, but otherwise reserves all copyright rights whatsoever.

BACKGROUND OF THE INVENTION

The present invention relates generally to systems and methods for communicating information in a distributed information system and, in a specific embodiment, provides an improved system for handling virtual objects in a distributed system.

The term "object" has taken on multiple independent meanings through overuse. In object-oriented programming, an object is a programming "package" of data elements and executable code. In a virtual world environment, "object" refers to a construct which is a definite entity, usually modelling an analogous real-world object (a third meaning of the term "object"). To further confuse the terminology, virtual world objects modelling real-world objects are often implemented using OOP objects. Therefore, less confusing terminology is used herein. "Object" refers to a model of a real-world object, such as a rock. "Server" refers to an OOP object.

Several other terms used herein have understood meanings in the field of object-oriented programming. A server encapsulates data and methods (executable code for performing functions specific to that server). The template for that server is called its class. For example, a server for a directory listing might encapsulate (as the data) the directory entries and (as the methods) routines for printing the list, sorting the list, etc. specific to that class. A class does not actually contain any data. The data for an actual server exists only when an "instance" of the server is instantiated. The code for the methods and the structure of the data of a server is described by the class definition for the server's class.

Often, the need exists for an instance of an object to be available in different places, on different machines running different operating systems and different hardware, and for a model of the environment which allows for an object to be distributed over multiple machines.

Currently known distributed objects are organized in a hierarchy controlled at a server node. Such a hierarchical distributed object organization is inflexible, because all control is exercised by a server. For network participants not controlling the server, the result is operational impotence.

Currently, individuals developing object oriented distributed systems may follow a model in which state information with respect to selected objects of a distributed system is replicated in each object with respect to selected other objects of a particular distributed system. Another approach to developing object-oriented distributed systems follows a model in which state information with respect to selected objects of a distributed system must be explicitly communicated for each object with respect to selected other objects of a particular distributed system. Either approach is accompanied by undesired overhead which hampers operability. The first approach has undue overhead due to excessive replication of state information. The second approach is hampered by excessive communications overhead involving objects obtaining state information from each other. It is accordingly desirable to develop a distributed object-oriented system which optimizes the sharing and retention of state information between objects which are established for interoperability with each other.

SUMMARY OF THE INVENTION

According to an embodiment of the present invention, an object-oriented system includes distributed objects having presences over a plurality of associated agencies. The agencies have agency boundaries such that one agency need not trust another agency to operate correctly. Unums represent entities in the object-oriented distributed system, where an unum has a presence on each of multiple agencies where other objects on those agencies desire to interact with the unum.

Each presence of the unum is organized into logical units called "ingredients". An ingredient includes state information and code implementing the particular presence associated with the unum distributed over several agencies. The state information linking the related object ingredients includes replicated references associating object ingredients as belonging to presences on particular agencies. The ingredients belonging to a common unum communicate directly with each other over agency boundaries by virtue of a trust boundary traversing agency boundaries. Similarly, ingredients belonging to a common agency communicate directly with each other over unum boundaries by virtue of a trust boundary traversing unum boundaries. The various trust boundaries are established by reference state information in each ingredient object. The references establish the allegiance of a particular ingredient to a particular unum and to a particular agency. The references thus make clear the allegiance of a particular ingredient to a particular unum.

The advantage of organizing ingredients according to unums distributed over several agencies is that an operable distributed system of users are able to communicate with object-oriented messages without having to engage in explicit machine-to-machine or agency-to-agency communication. By becoming a member of an unum system, simple, direct intercommunication is enabled without having to communicate explicitly across machine or agency boundaries.

An ingredient interface according to the present invention defines a message protocol that the ingredient presents to other ingredients within the same presence. The ingredient state descriptor defines state information internal to the ingredient which is instantiated for each instance of the presence which contains the ingredient. An ingredient implementation is the realization of the ingredient on a selected platform (e.g., Windows) or in terms of some particular standard (e.g., JPEG). Ingredient state information according to the present invention is maintained on a per-instance basis. The state of a particular ingredient is contained in a set of typed, named fields, each of which functions as a state variable. All the ingredients of all the presences of a particular unum collectively maintain the total state of the unum. The state maintained in a presence includes a joint state and a local state. An ingredient contributes to one of these two kinds of state information. Such ingredients are called joint ingredients and local ingredients, respectively. The local state according to the present invention is known only to the particular agency on which that presence is found and is not shared with others. A field of a local ingredient is visible only to that ingredient. The joint state according to the present invention is known to all presences of the unum and is shared in common among them. While the fields of a joint ingredient are scoped in the same way the fields of a local ingredient are, a copy of any given joint ingredient is found in all presences, and its state is the same in all presences (neglecting differences due to communications delays). Ingredients, presences and unums communicate with each other via messages. When the trust boundaries are secured, ingredients can only communicate with other ingredients of the same presence, and presences can only communicate with other presences of the same unum (between agencies) and unums can only communicate with other unums in the same agency. These limitations are enforced by object references. If an object sends messages which violates a compact with a target object, the target object revokes its reference, thus preventing further messages from the offending sending object and thereby enforcing security rules.

According to the present invention, an unum is an object distributed over a plurality of agencies, which establishes an intra-unum/inter-agency communication trust boundary. Further according to the present invention, a presence is an agency-local instance of an unum inside this trust boundary. Further according to the present invention, an ingredient is a component part of a presence. Further according to the present invention, an agency is a logical process instantiated over a predetermined number of unums.

According to the present invention, an unum is established by creating ingredients at the level of its interface and attributes, and at the level of its implementation; and interconnecting ingredients into presences and unums.

According to the present invention, ingredients are able to communicate with other ingredients within a presence (on the same agency,) through an ingredient interface, as well as across an unum boundary through an unum interface.

Further according to the present invention, an ingredient communicates directly with a presence other than its own, within the same unum through a presence interface.

Further according to the present invention, an ingredient communicate directly with another unum within its own agency.

A further understanding of the nature and advantages of the inventions herein may be realized by reference to the remaining portions of the specification and the attached drawings.

BRIEF DESCRIPTION OF THE DRAWINGS

FIG. 6 is a block diagram of presence structure according to the present invention including role descriptors and method mappings.

FIG. 7 is a block diagram showing a generalized communication channel between two objects within a trust boundary and across a thrust boundary according to the present invention.

DESCRIPTION OF THE PREFERRED EMBODIMENTS

Figure 1A:
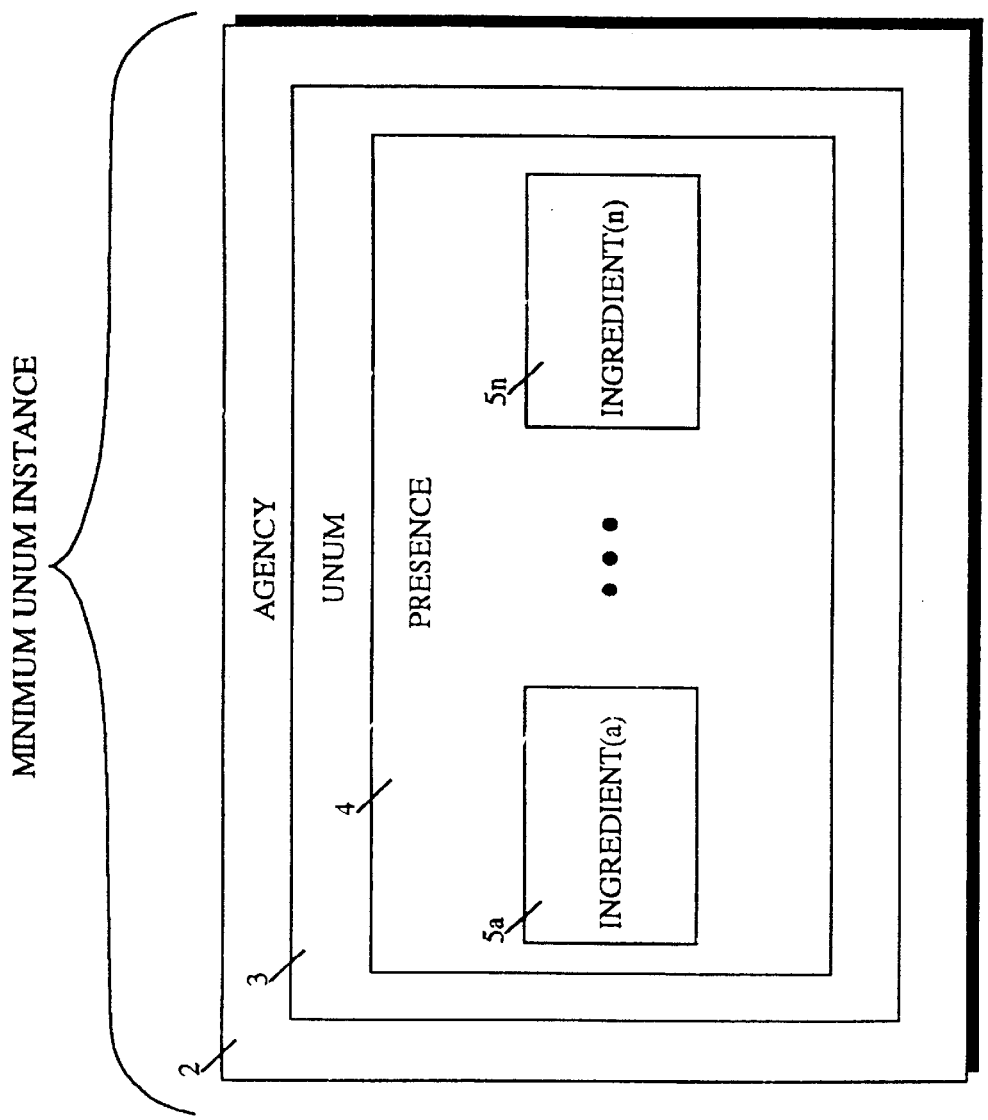
FIG. 1 is a block diagram of a distributed computing system having a plurality of agencies according to the present invention.

The preferred environment for the embodiments described here is a distributed world computing system. In the distributed world system, the world is partioned into regions, which can be analogized to rooms or geographical zones. The system is distributed over multiple agencies, which communicate with each other. As used herein, an agencies need not correspond with machine boundaries, as one agency could comprise multiple machines and one machine can run more than one agency. Agency boundaries correspond to trust boundaries, i.e., an agency "trusts" the code and data within its trust boundary and is suspicious of messages received from entities outside the agency's trust boundary. Whether the trust is misplaced is of only marginal relevance, because a well-designed and suspicious agency will not allow the corruption of its internals to the point where those internals are no longer trusted.

For each region, a number of agencies are "involved" with that region. One agency is the host agency for the region and the other agencies are participant agencies for the region. The region typically contains a number of unums which are associated with that region, and each agency which is involved with the region maintains a copy of each unum is the region, although the unums might be implemented differently on different agencies. Using the example of a virtual world, the region might be a room and the room might contain several avatar unums, a rock unum and a chair unum. As with the region, each unum has one host agency and zero or more participant agencies. The host for the unum controls the unum, but the host for the region also controls the unum. For example, the host for an avatar controls what the avatar will say and where it will move, but the region host controls whether the avatar will be able to move where it wants to move.

Host control is necessary to prevent a participant from "spoofing" an action with an unum, such as tricking all the other agencies into believing that an avatar's host just walked its avatar off a cliff, but also to limit the ill effects of a program which is running incorrectly. For example, if a region host determines that an unum host keeps trying to move the unum is a way that doesn't make any sense, the region host is able to remove the malfunctioning unum from the region.

An unum in a region has a "presence" in each agency involved with the region. The presences are dynamic, as agencies will come and go with their involvement with the region. The first presence of an unum is called the "prime presence" and is often the host presence (i.e., the presence which is on the host agency for that unum), but that need not always be the case, as a host may hand off control to a participant to be the new host for the unum. With multiple presences of an unum, there is always one host and one or more participants.

Each unum has a single, invariant class definition describing the unum (by its data structures and methods, etc.), but this definition need not be instantiated completely at every presence of the unum. Instead, each agency possesses a subset of the class definition suited to its platform and whether the agency is the host or a participant with respect to that unum. The class definition of the unum is made up of a collection of ingredients. Each ingredient is executable code, literal data, or a mixture of the two. When the class definition is instantiated as a presence, the instantiation also contains data structures containing state information for the unum. The state has two components: joint state and local state. Joint state data describes those attributes of the unum which are the semantically same at each presence (they might not be bit-for-bit the same and might be unsynchronized for short periods due to transmission delay). The local state is data that only the local presence cares about.

An agency may manipulate the local state of any unum that has a presence on the agency in any way the agency chooses. It can also alter its local copy of the joint state any way is chooses. However, this may result in the presence becoming desynchronized from the other presences of the unum and cause termination of the unum. If a participant is modifying its own copy of the joint state, it may do something that is impossible for the correct state and the participant agency may end up being ignored by the host agency for that unum and the host agency might inform all other participants to do the same. If the host agency modifies the joint state of the unum in a way that is not proper for that unum and broadcasts the new state to the participant agencies, some participant agencies might choose to remove the presence of the unum from its system. Since the misbehavior only affects the agency which is misbehaving, it doesn't matter. All that is required (and all that can actually be required) is that changes to the joint state be mediated through the host agency for the unum.

Figure 1B:
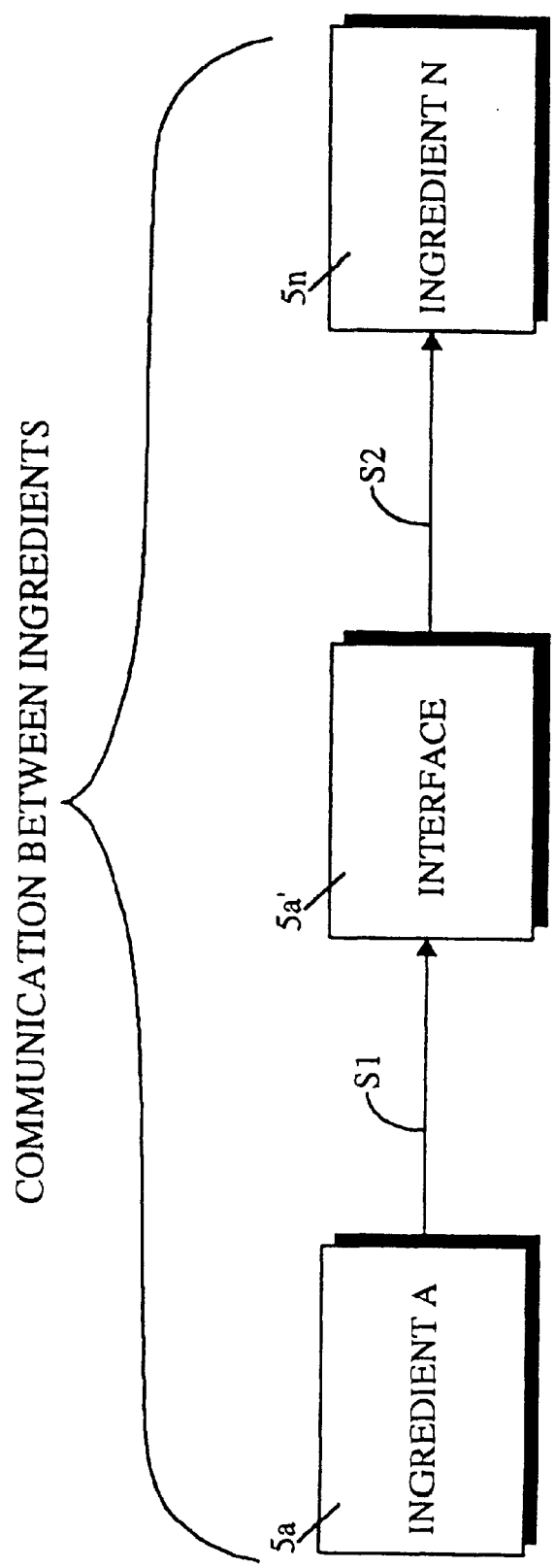
Figure 1C:
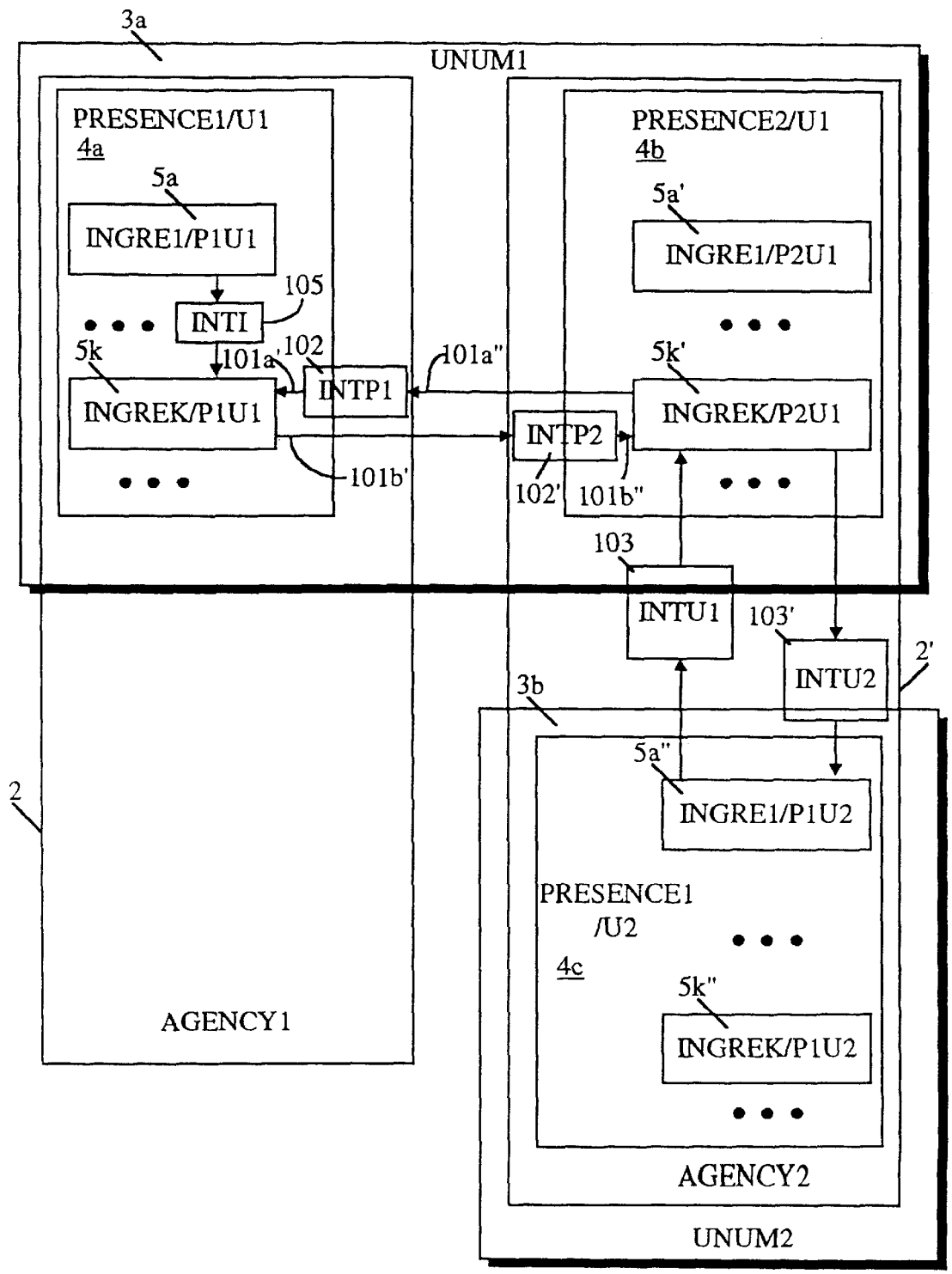

FIG. 1 shows two agencies, Agency X and Agency Y. The present invention can accommodate many more agencies, but only two are shown for simplicity. Agency X and Agency Y are mutually untrusting processes. This is not to say that any agency cannot be trusted, but just that the agencies are designed with the assumption that another agency may prove to be untrustworthy, either by design of the person or computer in control of the agency or by malfunction of a component of the agency.

Each agency includes a message I/O handler 100, a presence instantiator 102, various presences which have been instantiated by presence instantiator 102, a message compliance checker 106 and an object reference table 108. It should be understood that, in certain implementations, the various elements described herein might be just subcomponents or subfunctions of an integrated software system operating as the agency, or they may be separate components. For descriptive purposes, they are described here as being separable components. For example, the functionality of message compliance checker 106 might be distributed several ingredients and the agency itself.

The agencies communicate with interagency messages, which can be of different species. Some messages are messages from an agency itself to another agency, whereas other messages are from a presence on one agency to a presence on another agency. An agency also handles messages between presences on that agency (inter-unum messages). The agency might handle messages between ingredients which are wholly within a single presence (intrapresence messages), or these might be handled internal to the presence without routing through the agency's message I/O system.

Figure 2:
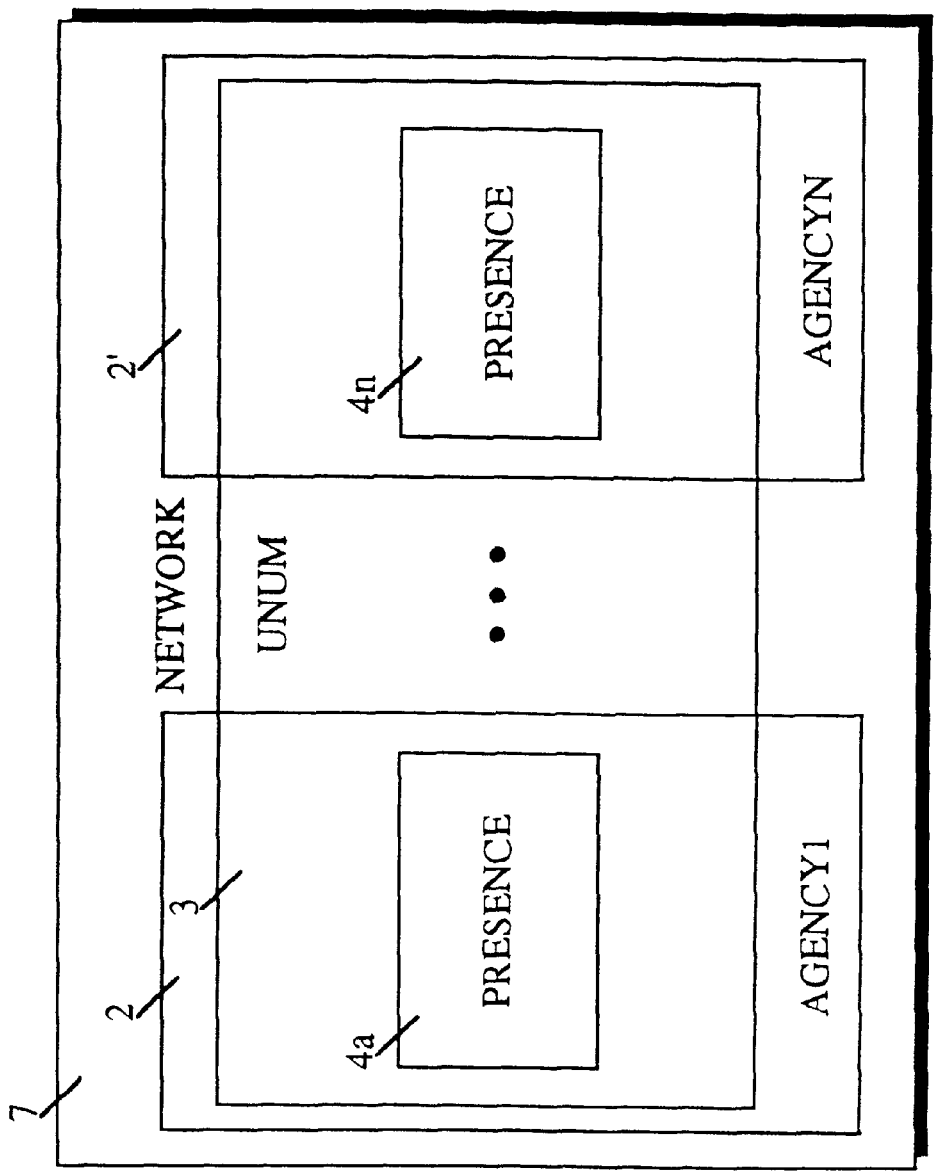
FIG. 2 is a block diagram of the agencies shown in FIG. 1, but emphasizing different elements of the agencies, such as unums, presences, ingredients and various interfaces.
Figure 3A:
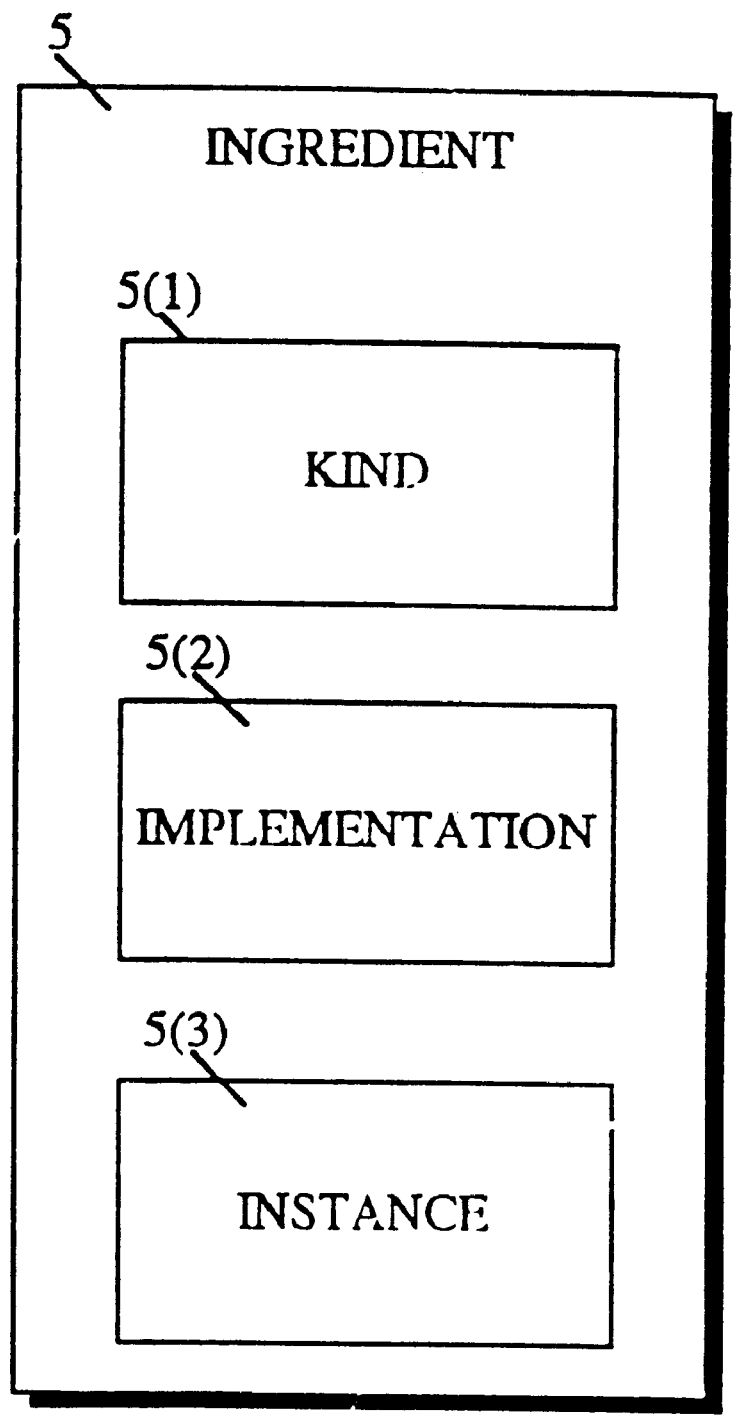
FIG. 3 is a block diagram illustrating the various interfaces of the distributed computing system shown in FIG. 2, including the various message that pass among elements of the system.
Figure 3B:
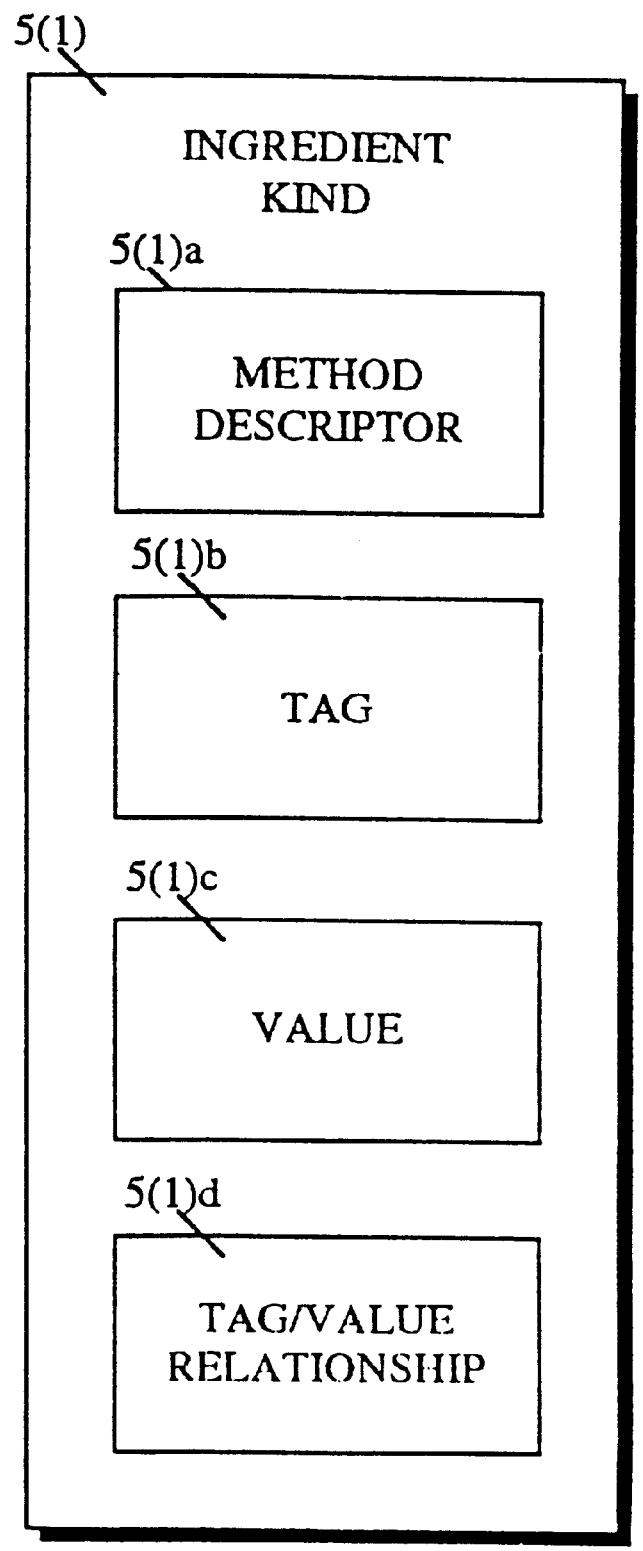
Figure 3C:
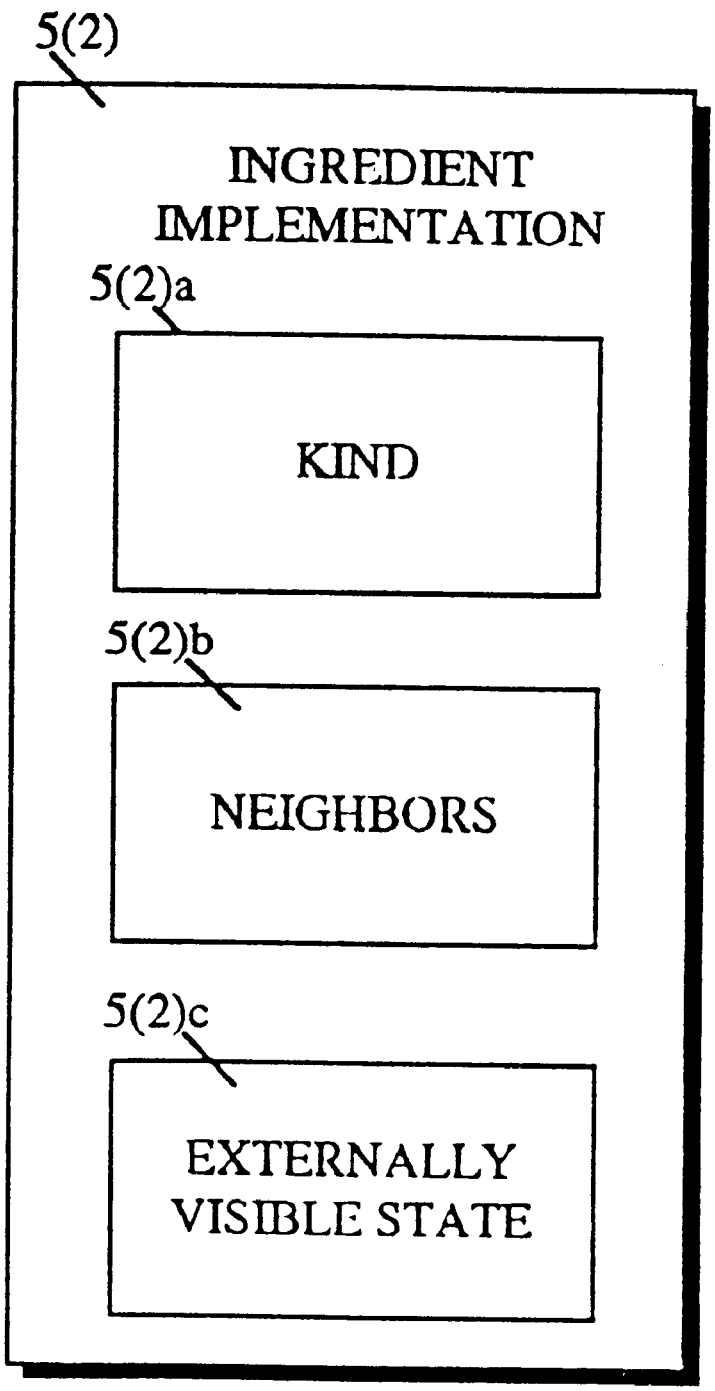
Figure 3D:
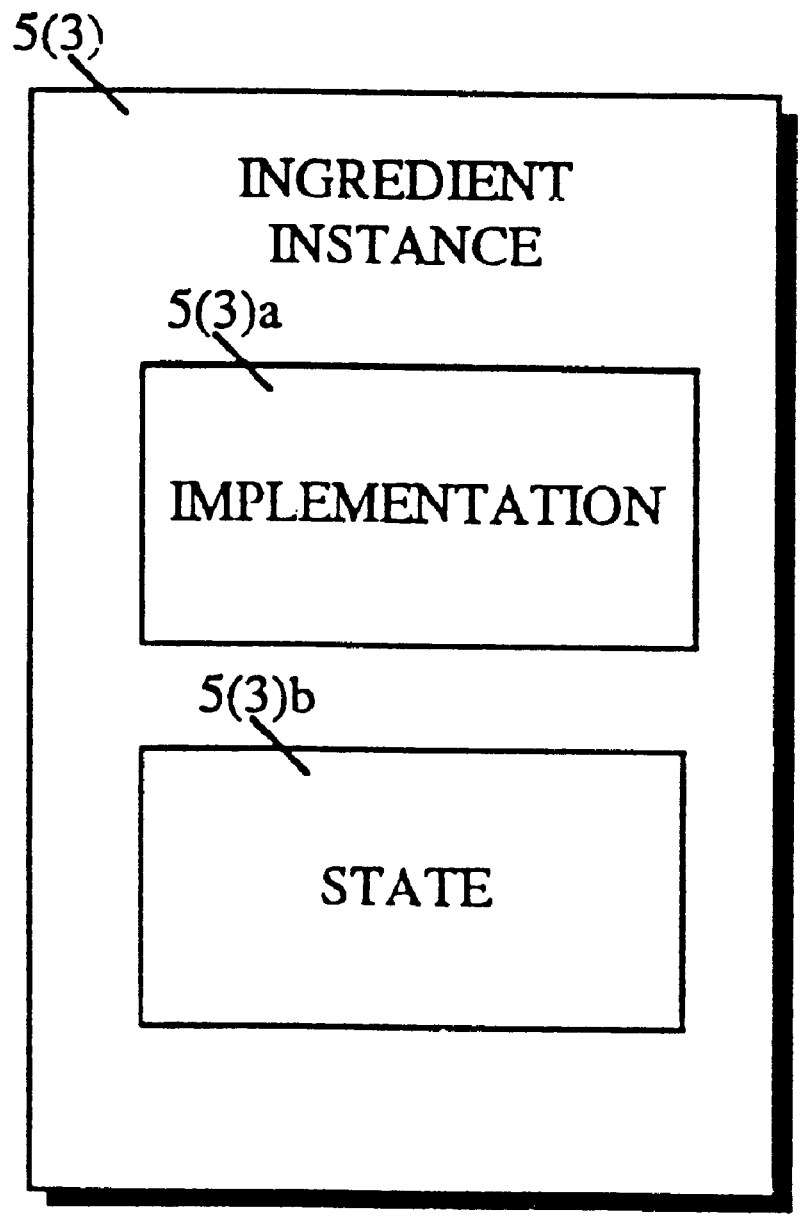
Figure 4A:
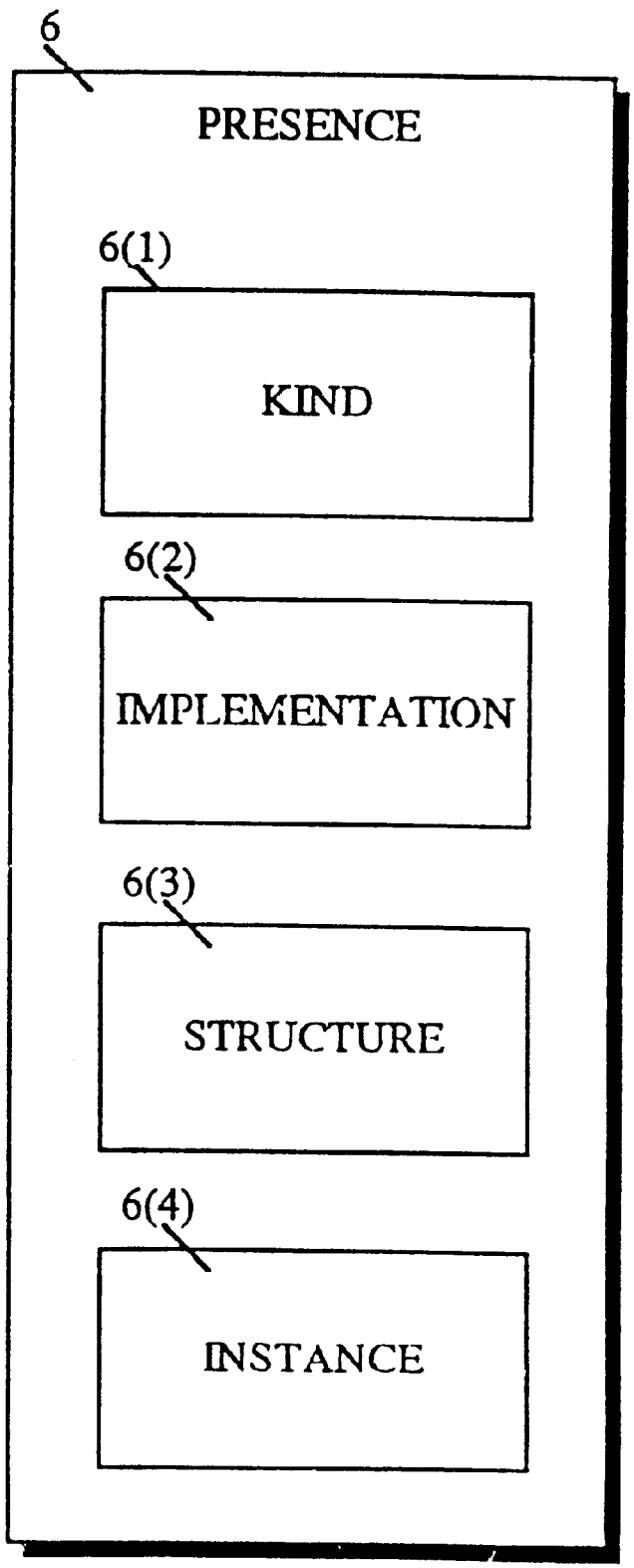
FIG. 4 is a block diagram showing several components of an ingredient.
Figure 4B:
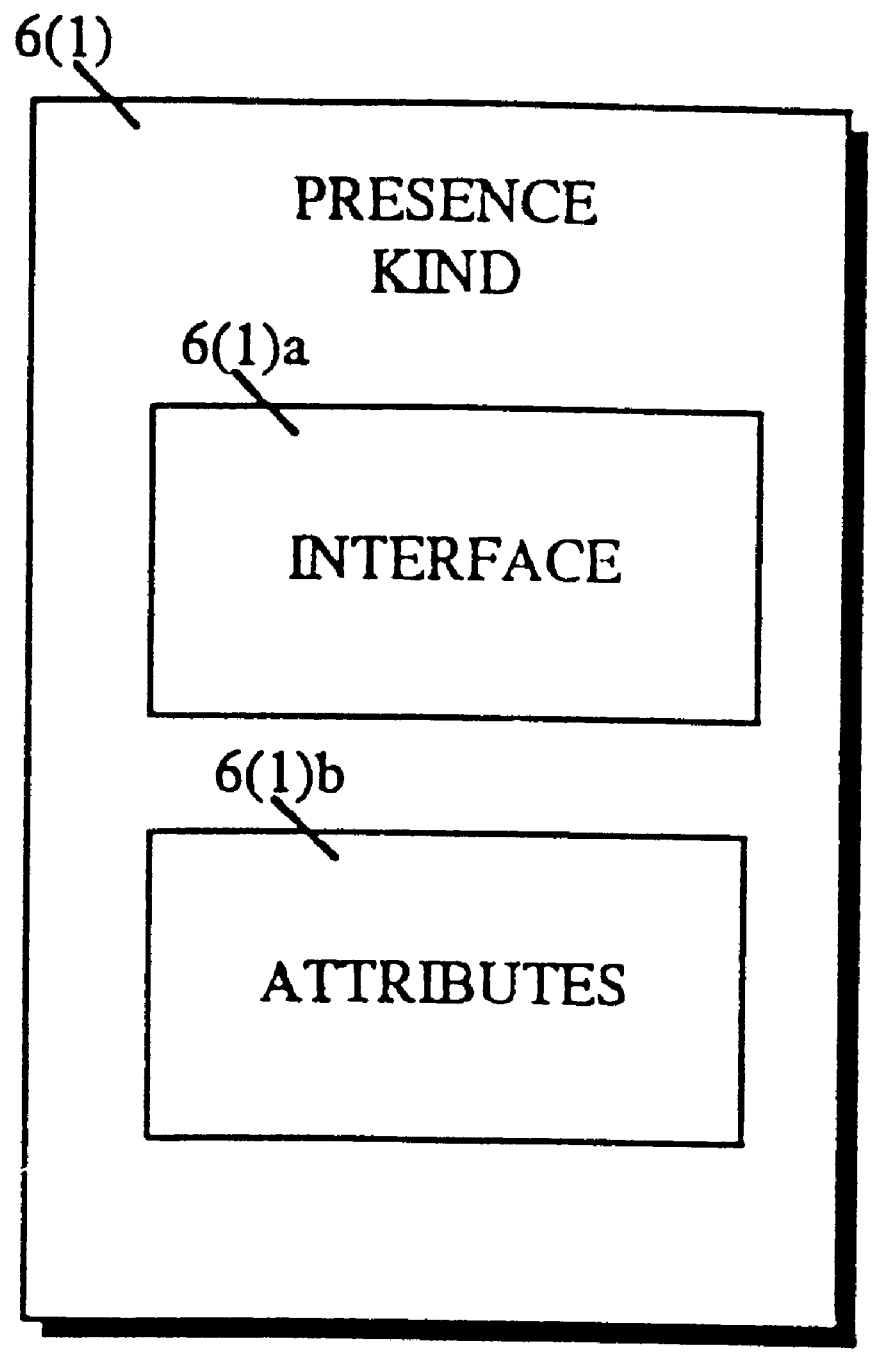
Figure 4C:
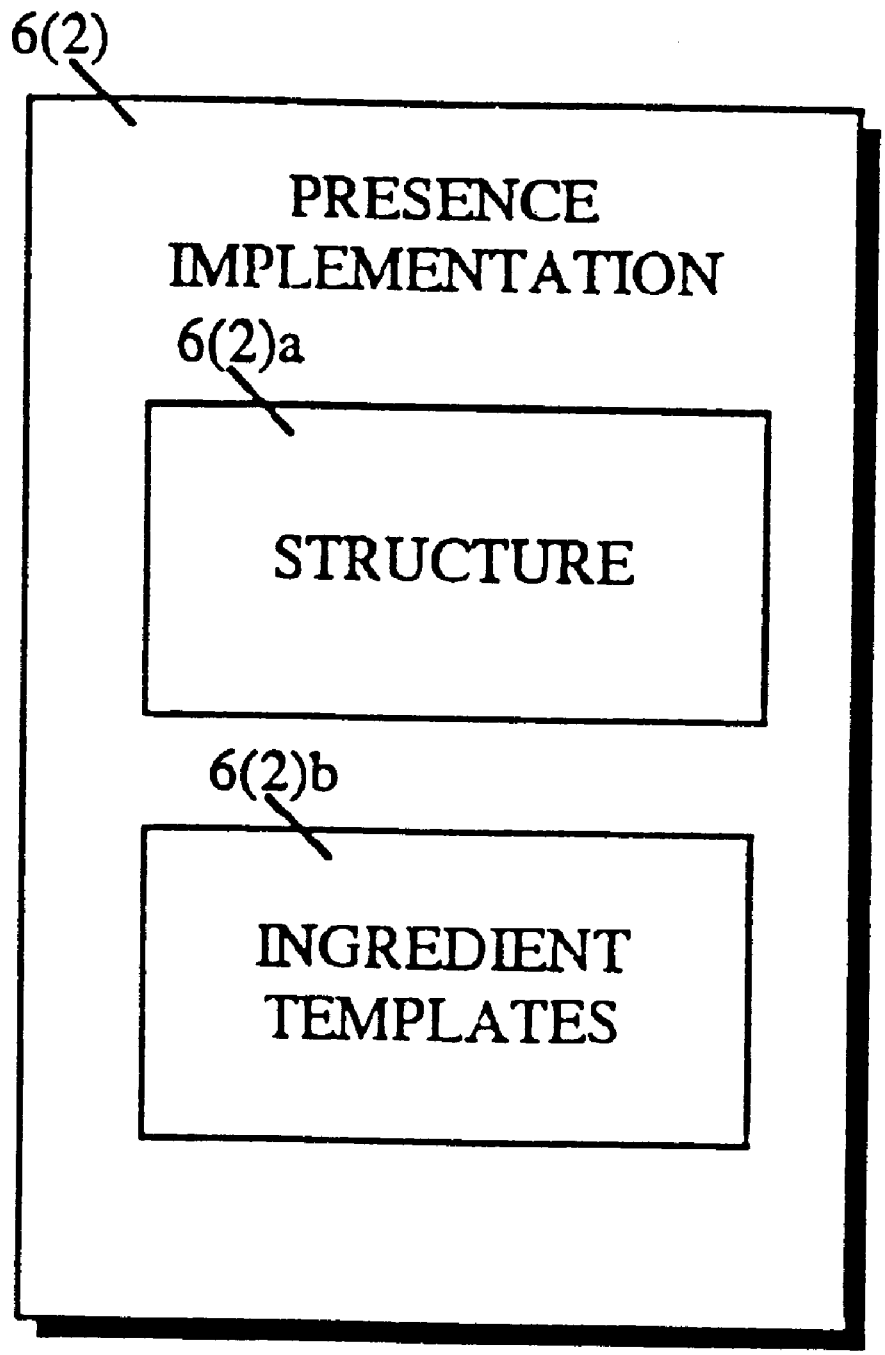
Figure 4D:
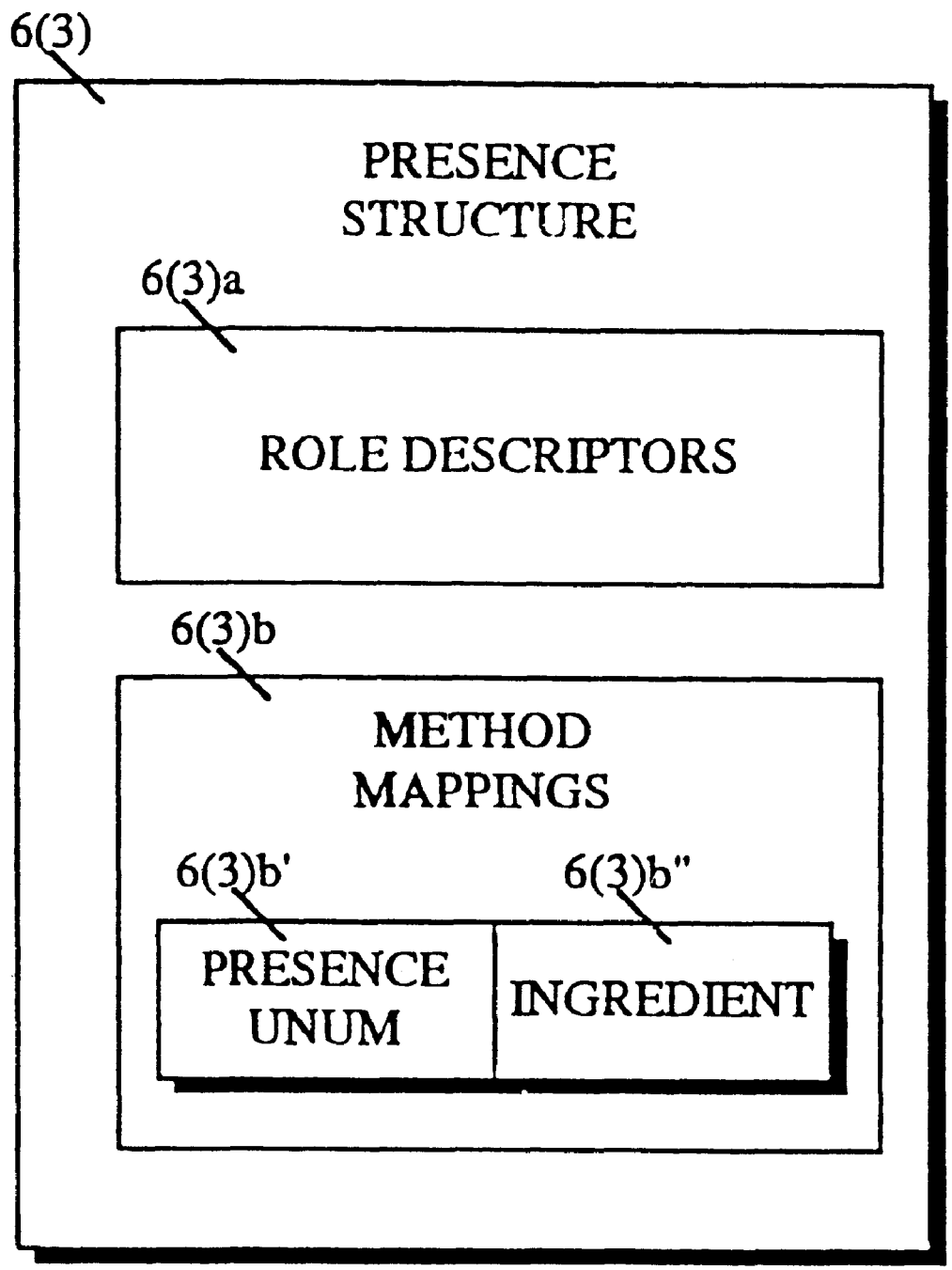
Figure 5A:
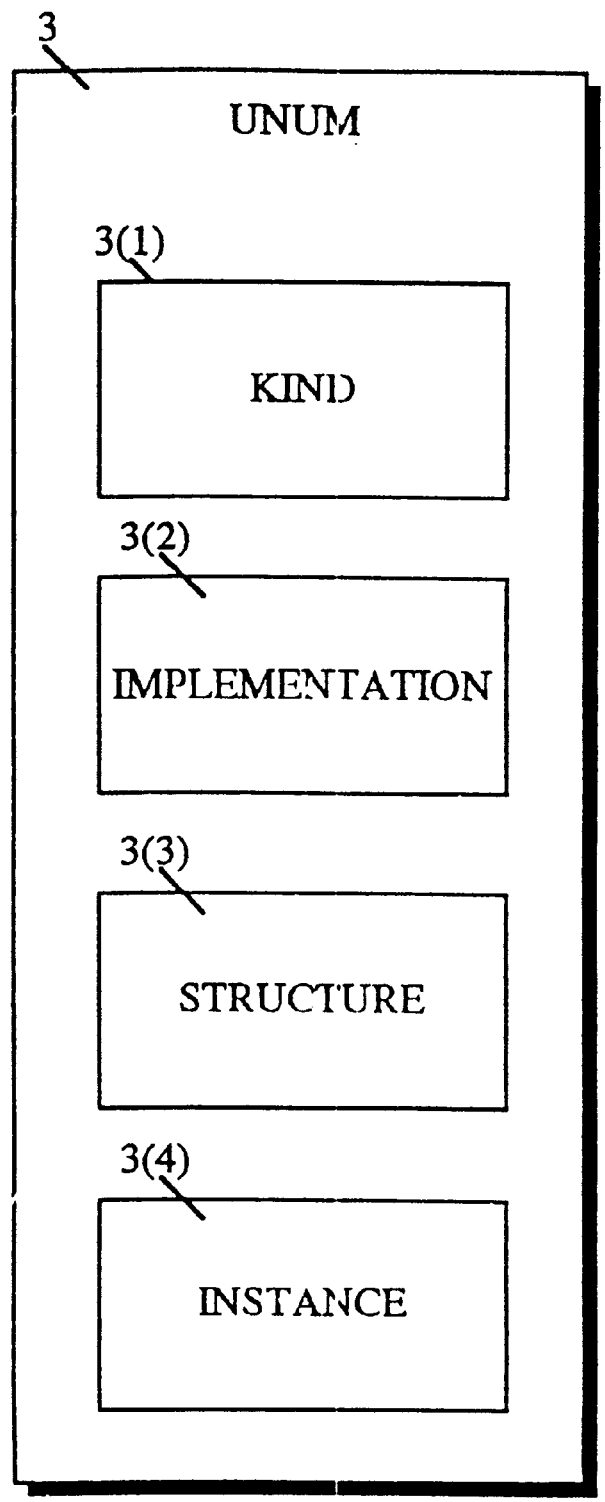
FIG. 5 is a block diagram showing various components of a message as might be passed between components of the distributed computing system.
Figure 5B:
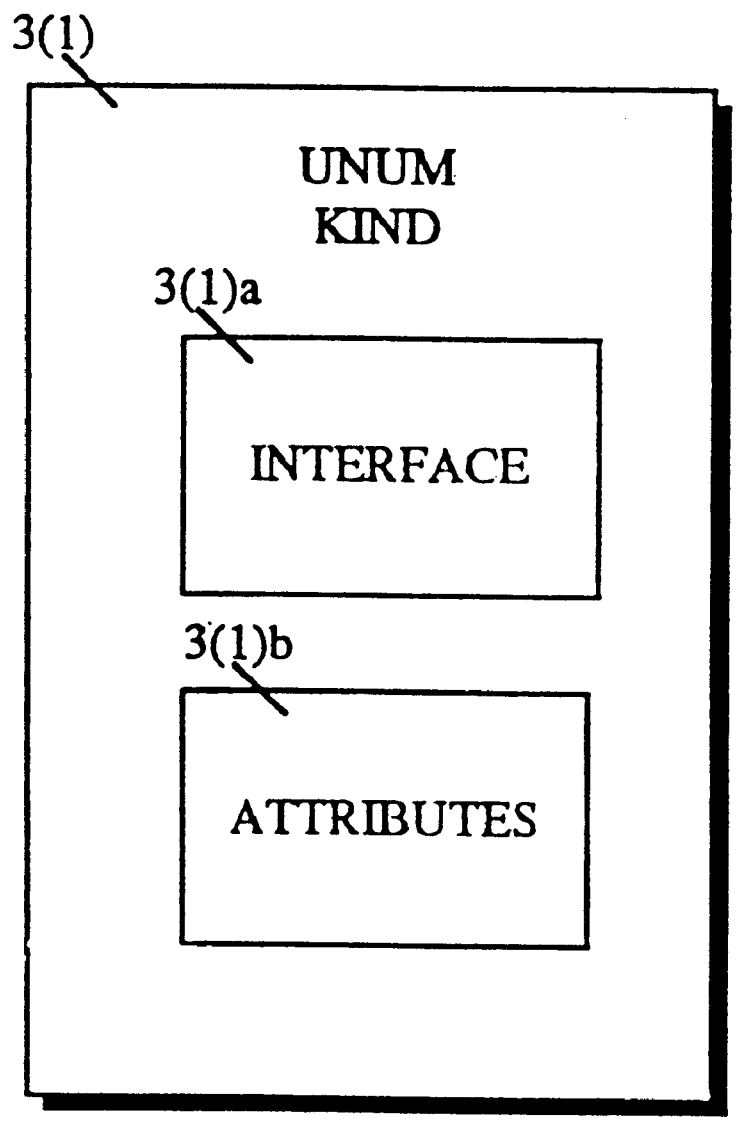
Figure 5C:
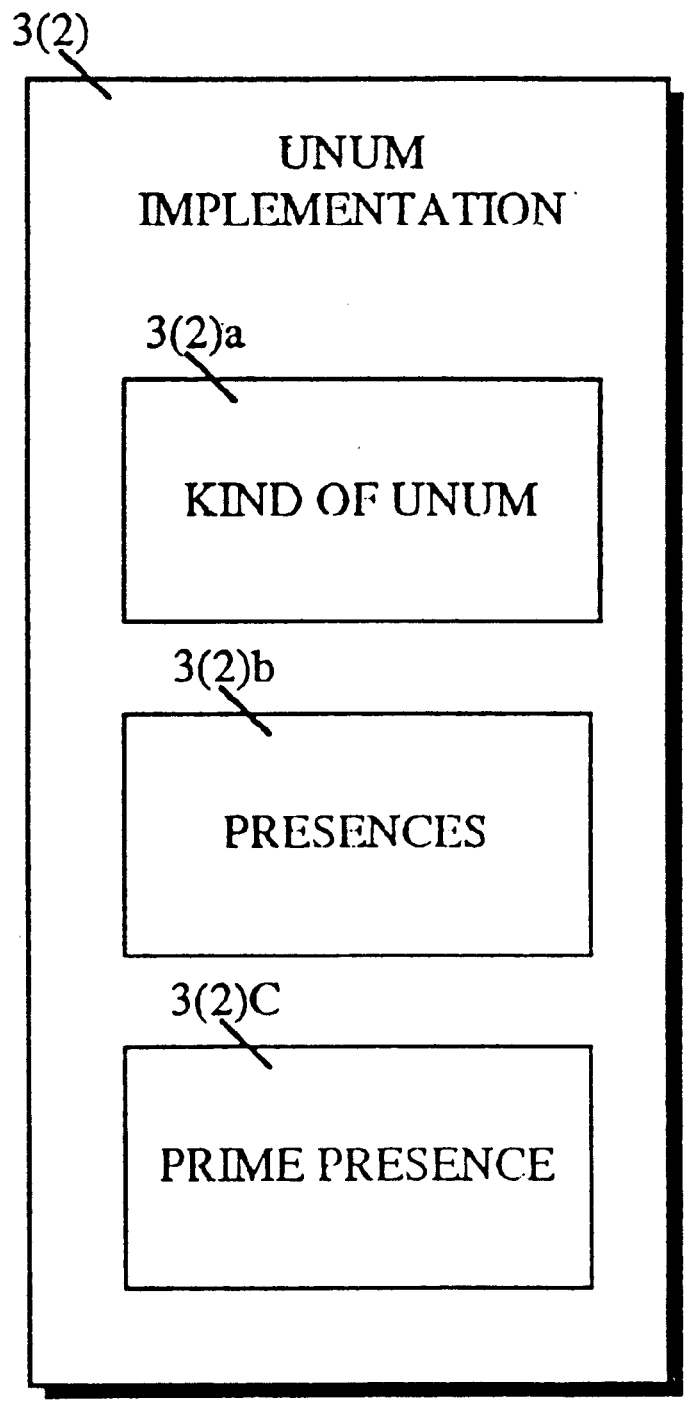
Figure 5D:
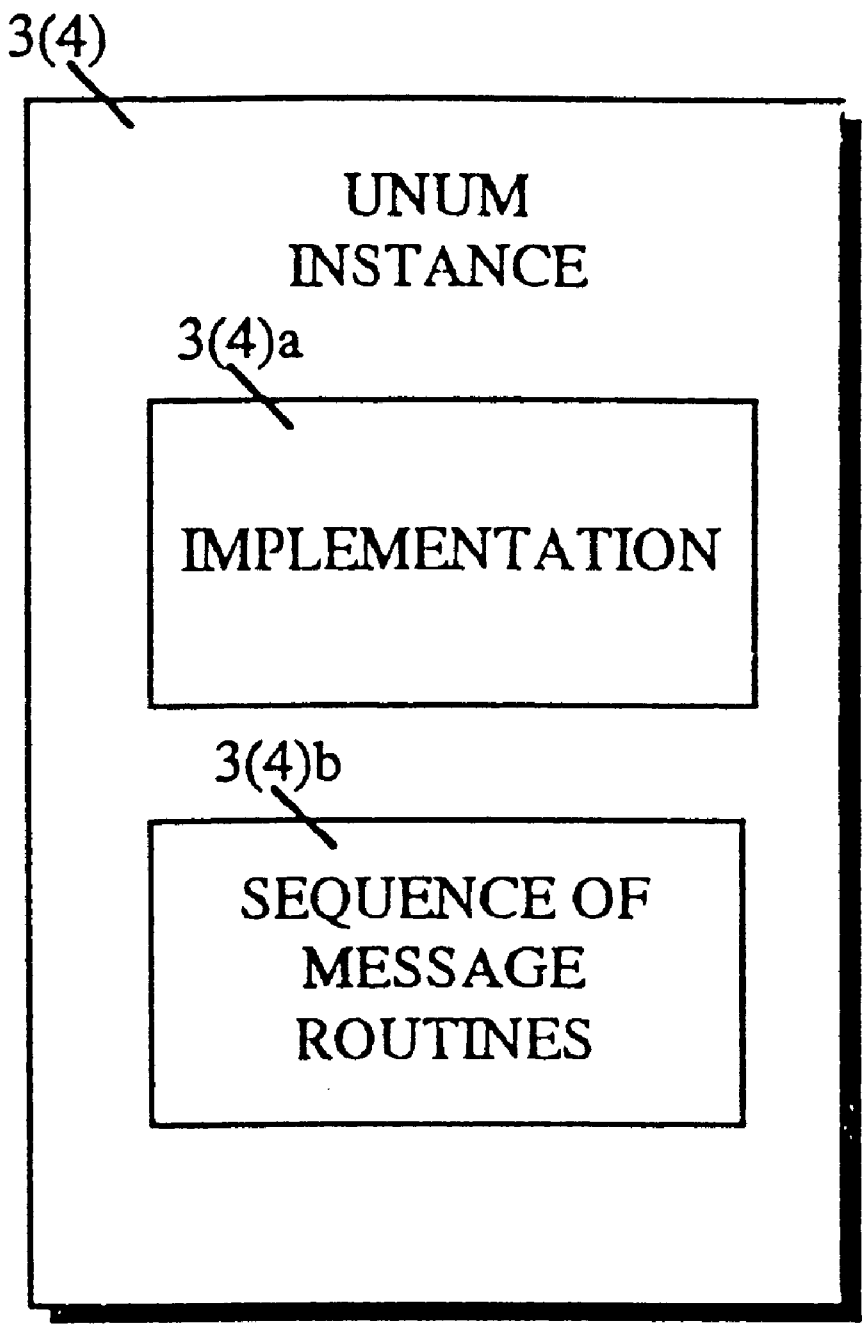

FIG. 2 shows the two agencies of FIG. 1 in more detail. In FIG. 2, both agency X and agency Y have presences for unum R and unum S (presences RX, SX, RY and SY). Presence Rx is shown including two ingredients (ingredient A 122 and ingredient B 120). Presence RY is shown including an ingredient A 124 and an ingredient C 126. Presence SY is shown including an ingredient D 128. These ingredients are implementations of objects in an object-oriented programming sense. Ingredient A 122 corresponds to ingredient A 124, but they might not be identical if their respective agencies have different requirements for ingredients or different platforms. For example, if agency X is running on a Unix™ workstation with high-resolution graphics and agency Y is running on a Windows®-based personal computer with low-resolution graphics, ingredient A 122 might be written in C with high resolution display routines while ingredient A 124 is written in E with low resolution display routines.

Ingredients are somewhat independent of each other, in that one implementation of an ingredient can be substituted for another implementation, so long as both the implementation complies with the "contract" for that ingredient's "ingredient kind". The ingredient kind defines what interface the ingredient will present to other ingredients, presences within the ingredient's unum and unums within the ingredient's agency. Since ingredients are independent of each other, and there is no central security system controlling the use of ingredients, a mechanism is provided to control the behavior of ingredients in the distributed system.

The ingredients (and their logical aggreggations into presences and una) communicate by sending messages over interfaces. Several interfaces are shown in FIG. 2. Intrapresence interfaces 132, 140 control messages between two ingredients within a common presence. An interpresence interface 136 controls messages from an ingredient in one presence to a corresponding ingredient in another presence of the same unum. An inter-unum interface 144 controls messages from an ingredient in one presence on an agency to another unum (more precisely, the presence of that other unum on the same agency). Each interface spans a trust boundary and since, by definition, an object on the other side of a trust boundary cannot always be trusted to operate properly, the distributed system has mechanisms for blocking messages on any interface to limit the effects of a misbehaving ingredient.

FIG. 3 illustrates this point in more detail. As shown therein, when ingredient B 120 desires to communicate with ingredient A 122, it sends a message 130 over intrapresence interface 132. When ingredient A 122 desires to communicate with ingredient A 124, it sends a message 134 over interpresence interface 136. In many cases, one message will cause the generation of another message. For example if ingredient B 120 sends a message to ingredient A containing information which would change a state variable which is global over all presences of unum R, this will cause a message to be sent over interpresence interface 136 to ingredient A 124 (and all other ingredients A which are "neighbors" of ingredient A 122).

In order for messages to be routed to their target, messages include references to the target object. If a referenced object determines that a neighbor is not behaving properly (such as when the operator of an agency is running a hacked ingredient or the program code implementing the ingredient is flawed), the target reference can be revoked as to that neighbor. This is accomplished by the target changing its reference and informing all other, well-behaved neighbors of the new reference. This type of message control exists between intergredients, presences and una. Messages over interpresence interface 136 can be blocked by agency X or agency Y (since all messages ultimately pass through an agency-to-agency communications channel), or are blocked at an unum-agency boundary.

Other message paths shown in FIG. 3 include intrapresence interface 138 over which a message 138 is sent and inter-unum interface 144 over which message 142 is sent.

Referring now to FIG. 4, a basic structure of an ingredient 200 is shown. An ingredient has a kind, which defines its interface and how it will interact with other objects and has a list of neighbors. An ingredient also has elements found in conventional object-oriented objects, namely code to implement methods, constants and state variables (object data). The list of neighbors identifies the objects (ingredients, presences and una) to which the ingredient can send messages. If an ingredient receives messages indicating that another object has violated the terms of its contract (i.e., it is apparently not acting like its ingredient kind), that other object is deleted from the ingredient's list of neighbors and all other neighbors are provided with a new reference to that ingredient. Since messages are routed using the target reference, this effectively cuts off communication between the ingredient and the errant object.

An example of a message structure is shown in FIG. 5. A message 202 shown therein has a target reference 204, additional, optional) headers 206 for indicating the sender and including debugging information, and message data 212. Typically, the sender is not indicated in the headers of a message, so that messages can be transparently forwarded.

FIG. 6 is a block diagram of a presence implementation 250, which includes a list of method mappings 254, which describes the composition of a presence in terms of ingredients and encapsulates the concept of plumbing. More specifically, it describes the composition in terms of ingredient kinds. Each ingredient in the presence is assigned a role, which is simply a label that serves to identify that ingredient relative to the presence as a whole. A presence structure contains a method mapping relating the methods specified in the presence kind (and unum kind, as will be discussed below) to particular methods of component ingredients, enabling the ingredients to collectively realize the presence interface (and unum interface). These mappings define which methods of which ingredients handle which presence and unum interface functions. Referring back to FIG. 2, these mappings might indicate that messages to unum S are to be handled by a method in ingredient D. These mappings are necessary since the presences and una do not have methods of their own, but are just collections of ingredients. Of course, some ingredients' sole purpose might be to handle unum and presence intercommunication.

FIG. 7 is a block diagram illustrating how messages are sent over a trust boundary. Trust boundary 700 separates objects A and B from object C. This trust boundary can be an ingredient—ingredient, unum—unum, or agency—agency trust boundary. Since A and B are not separated by a trust boundary, object B trusts object A, so object A will always be able to send messages to object B. By contrast, object C does not always trust object A. To allow for communications which can be severed, a proxy for object C, $C_p$, resides on the same side of trust boundary 700 as does object A. The proxy object's purpose is to send messages destined for object C across the trust boundary. At the other end, the message I/O subsystem 100 for the agency on which object C resides receives the message, reads its target reference and forwards it to the object specified in object reference table 108. A simplified example of the contents of object reference table 108 is shown in Table 1.

TABLE 1

Object Reference Table

| Object # | Target Object |
|---|---|
| ... | ... |
| 231 | Object V |
| 232 | Object W |
| 233 | --- |
| 234 | Object A |
| 235 | Object C |
| ... | ... |

In a generalized messaging system, any message can be routed to any object by specifying an agency and an object in that agency's object reference table, if the object reference is a valid reference. Thus, a message from object A to object C will contain an indication of object C's agency and the object reference "235". Table 1 also shows that object reference 233 is a revoked reference. Any messages received by the agency with that object reference will be returned undelivered. Such messages might be expected when an object was misbehaving and continues to send messages after the offended object had its reference moved and only informed its well-behaved neighbors of the new object reference. Of course, in most practical implementations, the object references are numbers selected from a large enough pool that they cannot be guessed easily.

In the distributed object system described above, object-oriented objects are organized into ingredients and ingredients are logically organized into una distributed over agencies. When an agency first instantiates an unum, it creates a prime presence. As part of this process, the agency determines, from the unum kind, structure, etc., what the unum needs to operate (resources, nieghbors, etc.) and sets up the ingredients for the prime presence. This may involve retrieving code from prespecified locations to implement the methods of the ingredients.

When a second agency instantiates a nonprime presence of an existing unum, it must communicate with the prime presence (or another nonprime presence) so that the new presence is on the list of neighbors for one or more presences of the unum. The initialization of a nonprime presence is different from the instantiation of a prime presence, in that some assistance in setting up a new presence might be provided by the prime presence and in that the agency must perform the tasks of making sure that the presences are neighbors of each other so that intra-unum information can be shared. However, once instantiated, there is generally no continuing difference between a prime presence and a nonprime presence. Of course, in many cases the prime presence will have a host role and the nonprime presences will have participant roles with respect to particular state information. For example, an avatar unum might have a presence on the agency controlled by the person controlling the avatar. If the avatar unum has presences on other agencies, those presences look to the host presence to find out what the avatar is doing or wants to be doing. Nothing in the architecture, however, prevents a prime presence from transferring the host attribute to another presence.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

Appendix A. Pluribus Specification Details

The Pluribus input language enables the user to describe the various entities in a Pluribus system.

In the grammar that follows, courier is used to indicate literal keywords and punctuation, *italics* are used to indicate meta-syntactic variables. French quotation marks ("<< >>") are used to indicate optional elements. An optional element followed by a superscripted asterisk ("*") indicates zero or more repetitions of the element, while a superscripted plus ("+") indicates one or more repetitions.

Names in Pluribus are ordinary symbolic identifiers. They follow the same lexical rules as identifiers in C: a sequence of one or more alphanumeric characters, the first of which must be a letter. Case is significant. The underscore character ("_") is an honorary letter; unlike Java, however, the dollar sign character ("$") is not.

Numbers in Pluribus are integers (Pluribus itself has no need for floating point numbers; ingredient implementations may, but their code is outside the scope of Pluribus' syntax). These numbers follow the same lexical rules as C: a decimal number consists of one or more decimal digits; an octal number consists of a "0" followed by one or more octal digits; a hexadecimal number consists of "0x" or "0X" followed by one or more hexadecimal digits (case unimportant). Character constants are treated as numbers, again, just like C. A character constant is one or more characters enclosed in apostrophes ("'"). The standard repertoire of ANSI C escape sequences ("\" followed by a character) is recognized. Multiple-character constants are allowed, up to the precision of Pluribus' integers (i.e., 4 characters).

Strings in Pluribus consist of any number of characters between quotation marks ("""), with, once again, the usual "\" escapes recognized.

Both C and C++ style comments are recognized: anything between "/*" and "*/" is a comment, as is anything between "//" and a newline. Comments are treated as whitespace. Whitespace, in general, can be used freely for formatting.

In any circumstance where a numeric value is required, Pluribus also allows simple arithmetic expressions. An expression is any of the following:

>
> *number*
> *expression* * *expression*
> *expression* / *expression*
> *expression* + *expression*
> *expression* - *expression*
> *expression* & *expression*
> *expression* | *expression*
> - *expression*
> ~ *expression*
> ( *expression* )
> *specialfunction* ()

where *number* is a literal number of some sort, the operators all have their usual meanings (and precedences), and *specialfunction* is the name of a function that is built into Pluribus.

Most Pluribus statements share a common format, and the typical Pluribus statement comes in three canonical forms. The first canonical form is:

```
<<extern>> keyword name {
attribute*
}
```

This is called the definition form. It defines one of the various kinds of Pluribus data objects, where *keyword* is a language keyword that specifies what kind of object is being defined, *name* is the symbolic name to give to the object being defined and each *attribute* is an attribute of the object. Precisely which kinds of attributes will be allowed will depend on *keyword*; some attributes may be mandatory. Each attribute is itself a Pluribus statement in one of the other two forms which will be described next.

The name *name* may be used anywhere within the containing scoping unit to designate this object. If the keyword extern is given, the name will also be available in the outer scope (see the discussion of modules and scoping below). Note that each kind of Pluribus object establishes a separate namespace; e.g., if you define an unum kind named "foo" and an ingredient implementation named "foo", there is no name collision.

The second canonical form is:

```
keyword name ;
```

This is called the invocation form. It is used in the body of an enclosing definition statement to invoke a previously defined Pluribus data object as an attribute of the object being defined, where *keyword* is a language keyword that specifies what kind of object that is being invoked and *name* specifies which object of that kind is intended.

The third canonical form is:

```
keyword {
attribute*
}
```

This is called the anonymous form. It is used in the body of an enclosing definition statement to both define and invoke a nameless Pluribus data object as an attribute of the object being defined, where *keyword* is a language keyword that specifies the kind of object that is being defined/invoked and each *attribute* is an attribute of the object. The meaning of the statement and the attributes is the same as for the corresponding definition form, except that no name is defined.

The invocation form and the anonymous form are collectively called attribute forms or simply attributes. The definition form and the anonymous form are collectively called
<u>definition forms</u> or simply <u>definitions</u>. Note that the
anonymous form really is both a definition form and an
attribute form at the same time. In the discussions below,
these terms will be used frequently.

Symbolic names created by the various definition
forms are lexically scoped. The fundamental scoping construct
is the <u>scoping unit</u>, which is described by the <u>unit statement</u>.
A scoping unit is a symbolically named package of symbolic
names. The definition form of unit statement is:

```
unit name {
statement*
}
``` where *name* is the symbolic name of the scope unit being
defined. Each *statement* may be any one of the definition
forms. The <u>unit definition statement</u> creates a named lexical
scope. All symbols defined inside the scope are not visible
outside it unless they are declared extern (see below).
Symbols declared extern are also visible in the immediately
enclosing outer scope. Note that a unit may itself be
declared extern. A scoping unit which is declared extern may
be imported into other scoping units, making any symbols
defined in it visible to the importing scope as if they had
been defined there originally. Note that an extern unit
definition must be the outermost construct in any compilation
unit.

The unit statement syntax is canonical. Its
invocation form is:

```
unit name ;
```

This invocation form has the effect of importing the
named scoping unit into the current scope, as just described.
The anonymous form is:

```
unit {
statement*
}
``` which creates a scoping unit but does not give it a name.
This can be used for information hiding and all the other
usual things one does with nested scopes in block-structured
languages.

Any name defined by a definition form statement
within the current scoping unit is visible inside the current
scoping unit. Any name defined in any enclosing scoping unit
is also visible, but an inner redefinition of a given name
hides any outer definition. Names defined in imported scoping
units are visible as if they had been defined in the current
scope; that is, an imported name hides the same name from an
outer scope. When a name is both defined in the current scope
and imported, the defined name hides the imported one. If the
same name is found in more than one imported scope, the name
cannot be used directly. When you wish to access a name that
has been hidden by an import or an inner scope definition, or

19 if you need to distinguish between the same name from
different imported scopes, a <u>name reference expression</u> may be
used. This takes the form:

*scopename . name* where *scopename* is the name of the scope from which the name
should be taken, and *name* is the actual name that you want.
Note that *scopename* may itself be a name reference expression.
The outer scope can be referred to by the caret symbol ("^"),
so that you do not need to know its name; i.e., ^ . *name* refers to *name* in the enclosing scope. Carets may be cascaded
to access successively more outer scopes, e.g.:

^^ . *name*
        ^^^ . *name* etc.

The outermost enclosing scope is defined by the
agency running the system. However, names (and thus the
objects they designate) may also be imported from scoping
units on other machines (assuming, of course, that you have
permission to do so). This is accomplished with the
statement:

remote *scopeURL name* ;

where *scopeURL* is a string containing a URL that designates
the machine and scope desired and *name* is the name by which
this scope will be known locally.
        A locally visible scope can be published for remote
import with a statement of the form:

publish *name* ;

where name is the name of the local scope that is to be made
publicly visible over the network or connector between the
local machine and remote machine.
        Each of the statements or attributes described below
have an entity type selected from one of the following entity
types:

o A <u>promise</u> states internal conditions that the entity
       with which it is associated is alleged to satisfy.
    o A <u>demand</u> states external conditions that must be
       satisfied for the entity with which it is associated
       to be valid or useful.
    o A <u>description</u> states conditions which may be
       interpreted as either a promise or a demand,
       depending on context.
    o An <u>action</u> states things which will be done or
       information which will be acted on in order to
       fulfill a promise or assert a demand.

20

State variables, message parameters and generic attributes are all typed. Such types must be declared before they can be used. Pluribus uses CORBA IDL types and type declaration syntax. The description of this type system is
5   outside the current scope of this document, but can be found in: Common Object Request Broker: Architecture and Specification from OMG.

10  The Generic attribute Statement [description]
Many kinds of Pluribus objects may be tagged with generic descriptive attributes, as discussed above in the Output section. A generic attribute consists of a symbolic label and an optional, typed value. Such attributes must be
15  defined before they may be used. Generic attributes do not follow the canonical syntax described in the previous section. The definition form of a generic attribute statement is:

attribute *name* <<*type*>> ;
20
where *name* is the symbolic name of the attribute being created and the *type* is the data type of its value. If *type* is omitted the statement defines a <u>tag attribute</u> which takes no value but which can be present or absent. Attribute values
25  may not have composite types.
The invocation form of a generic attribute depends on the context in which it is being used. When it is being used in a generation context, the invocation form is:

30        *attributename*  <<*value*>>;

where *attributename* is the name of the attribute being applied and *value* is its value (unless it is a tag attribute, in which case *value* is omitted). Alternatively, in such a context an
35  attribute may be defined in use with a statement of the form:

attribute *name* <<*type=value*>>;

which is the obvious shorthand for a declaration and use
40  folded into one statement. This is not quite the same thing as an anonymous form, since attributes always have names.
In a descriptive context, the invocation form is:

*attributename*  <<*relation* <<*value*>>>>;
45
where *attributename* is the name of the attribute, *value* is a value (which, as always, may be omitted in the case of a tag attribute), and *relation* is an operator that describes the relationship between *value* as given in this statement and the
50  value of the named attribute in the object in which this statement is found. More than one descriptive statement for the same attribute name is permissible. Possible operators for *relation* are:

55   <u>Operator</u>  <u>Meaning</u>
     <          less than
     <=         less than or equal to

```
>       greater than
>=      greater than or equal to
==      equal to
!=      not equal to
!       attribute not present
```

If both *value* and *relation* are omitted, the meaning is "attribute present".

The interface Statement [description]

Ingredients, presences and una all have interfaces, which are attached to them as attributes using the <u>interface statement</u>. The interface statement is a pure description; that is, it may be interpreted as either a promise or a demand, depending upon the context. The definition form of the interface statement is:

```
interface name {
    attribute*
}
``` where *name* is the symbolic name of the interface being defined. The allowed attributes are:

o interface attribute (description)
o method declaration (description)

The <u>interface definition statement</u> creates a named collection of method protocols. Each method declaration attribute adds a single method protocol to the interface. Each interface attribute adds the entire collection of method protocols from another interface to the interface. Each method declaration takes the form:

```
methodname ( <<parameter <<, parameter>>* >>) ;
``` where *methodname* is the name of the method and each *parameter* describes one of the parameters to the method, in the form:

```
type <<parametername>>
``` where *type* is the parameter's data type and *parametername* is an (optional) name for the parameter (note that this is principally for documentation purposes since the parameter name as given in the interface is not used for anything).

The interface statement syntax is canonical. Its invocation form is:

```
interface interfacename ;
```

And its anonymous form is:

```
interface {
    attribute*
}
```

The <u>interface attribute statement</u> associates a given interface with the object in which it is used as an attribute. It is used in these statements:

- o ingredientKind definition
- o presenceKind definition
- o unumKind definition
- o interface definition (recursively)

The ingredientKind Statement [description]

The <u>ingredientKind statement</u> is used to describe ingredient kinds. The ingredientKind statement is a pure description; that is, it may be interpreted as either a promise or a demand, depending upon the context.

The definition form of the ingredientKind statement is:

```
ingredientKind name {
    attribute⁺
}
``` where *name* is the symbolic name of the ingredient kind being defined. The allowed attributes are:

- o interface attribute (description)
- o generic attribute (description)

The <u>ingredientKind definition statement</u> creates a named, abstract ingredient kind that comprises an interface and arbitrary descriptive attributes. Each ingredient kind must have at least one interface attribute to define its interface; additional interface attributes simply add methods to the interface. Any number of generic attributes (including none) are allowed.

The ingredientKind statement syntax is canonical. Its invocation form is:

```
ingredientKind name ;
```

And its anonymous form is:

```
ingredientKind {
    attribute⁺
}
```

The <u>ingredientKind attribute statement</u> associates a given ingredient kind with the object in which it is used as an attribute. It is used in these statements:

- o ingredientImpl definition
- o neighbor attribute

The ingredientImpl Statement [action]

The actual implementation of an ingredient is specified using the <u>ingredientImpl statement</u>. The ingredientImpl statement is an action; that is, it describes
actual objects which may be instantiated and is qualified with
promises and demands which determine the circumstances under
which it may be used.
      The definition form of the ingredientImpl statement
is:

ingredientImpl *name* {
        *attribute*⁺
        } where *name* is the symbolic name of the ingredient
implementation being defined. The allowed attributes are:

o generic attribute (promise)
        o ingredientKind attribute (promise)
        o neighbor attribute (demand)
        o state attribute (action)
        o method attribute (action)
        o data attribute (action)

The ingredientImpl definition statement creates an
actual ingredient implementation. It must have exactly one
ingredientKind attribute and at least one implementation body
attribute (method or data), but may have any number of
generic, neighbor, or state attributes (possibly none).
      The ingredientImpl statement syntax is canonical.
Its invocation form is:

ingredientImpl *name* ;

And its anonymous form is:

ingredientImpl {
        *attribute*⁺
        }

The ingredientImpl attribute statement provides the
corresponding implementation to the object in which it is used
as an attribute. It is used in this statement:

o template attribute

The neighbor Attribute Statement [demand]
      Methods in an ingredient implementation need to be
able to send messages to other ingredients in the same
presence, but must be coded without explicit foreknowledge of
the environment in which the ingredient and its neighbor
ingredients will be placed. An ingredient implementation may
thus state requirements about what sorts of neighbors it must
have in order to function properly, associating these
neighbors with names by which its methods may refer to them.
These neighbor requirements are expressed as attributes of the
ingredient implementation with neighbor statements. The
neighbor statement is a demand.

The neighbor statement, since it is only used as an attribute, has no definition form (and, consequently, no anonymous form either, since that would be meaningless). Its (non-canonical syntax) form is:

neighbor *name kind* where *kind* is an ingredientKind attribute, as described above, which states what kind of ingredient the neighbor must be, and *name* is the name by which the implementation will know the neighbor (i.e., methods of the ingredient implementation in which this neighbor attribute is found will use this symbol to refer to the neighbor ingredient).

An ingredient implementation may specify as many neighbors as it likes, but they must all be given different names.

The <u>neighbor attribute statement</u> is only used in one statement:

o ingredientImpl definition

The state Attribute Statement [action]

Ingredient implementations may have state bundles, which are collections of state variables that potentially may be shared across presences. These bundles of variables are described by <u>state statements</u>. The state statement is an action, that is, it describes actual components of an ingredient instance.

The state statement, since it is only used as an attribute, has no definition form (and, consequently, no anonymous form either). Its (non-canonical syntax) form is:

state *name* {
*variable*⁺
} where *name* is the name by which the ingredient implementation will know the state bundle and each *variable* is one of the variables in the bundle. Each of the variables is defined in turn by a statement of the form:

*type varname* ;

where *type* is the variable's type and *varname* is its name (i.e., the implementation's methods will use this symbol to refer to this variable).

An ingredient implementation may have as many state bundles as it likes, but they must all have different names. Furthermore, the variables within them must all have unique names.

The <u>state attribute statement</u> is only used in one statement:

o ingredientImpl definition

25

The method Attribute Statement [action]
Ingredient implementations must include actual implementation, comprising methods which realize the behavioral aspect of an ingredient instance's being. A method is declared with a method statement. The method statement is an action; that is, it describes actual code which is compiled into an ingredient implementation to be executed by the cyberspace agency runtime.

The method statement, since it is only used as an attribute, has no definition form (and, consequently, no anonymous form either). Its (non-canonical syntax) form is:

method <<*language*>> *methodname* ( <<*parameter* <<, *parameter*>>*>> ) *code* where *methodname* and the *parameters* are exactly as described above in the discussion of the interface statement, *language* is an optional keyword expressing the form that *code* will take, and *code* is the actual code for the method. Pluribus is designed to operate, in principle at least, with code written in various different languages, some values for *language* are e (the default), pseudo and foreign. If *language* = e, then *code* must be a method coded in E, delimited by braces ("{" and "}"). If *language* = pseudo, the method is pseudo-code, for documentary and code development purposes; the "code" itself must be delimited by braces but may consist of nearly anything. Pseudo-code will pass through the Pluribus compiler without complaint but does not generate any output (if an optional compiler switch is set, a pseudo-code method will trigger a warning). If *language* = foreign, then *code* must be a string giving the name of an external file from which to take a precompiled method in standard form followed by a semicolon (";"). I.e.:

method e *methodname* ( *parameters* ) {
    *ecode*
    }
or
    method foreign *methodname* ( *parameters* ) *filename* ;

An ingredient implementation's methods must conform to the interface specified by the ingredient kind; that is, there must be the same number of operations with the same names and parameters.

The method attribute statement is only used in one statement:

o ingredientImpl definition

The data Attribute Statement [action]
Another form that ingredient implementations may take is blocks of static data. Such blocks are declared with a data statement. The data statement is an action; that is, it describes actual bits and bytes of data that will be incorporated in an ingredient implementation instance by the cyberspace agency runtime.

26

The data statement, since it is only used as an attribute, has no definition form (and, consequently, no anonymous form either). Its (non-canonical) syntax can take either of these two forms:

```
        data { hexdata }
or
        data filename ;
``` where *hexdata* is a series of raw hexadecimal values giving the data values literally and *filename* is a string giving the name of an external (binary) file from which the data should be extracted. Raw hexadecimal consists of a series of case-insensitive hexadecimal digits (0-9 and A-F). The hex digits may be freely interspersed with whitespace and comments, but no other characters are allowed prior to the closing brace.

The data attribute statement is only used in one statement:

o ingredientImpl definition

The presenceKind Statement [description]

The presenceKind statement is used to describe presence kinds. The presenceKind Statement is a pure description; that is, it may be interpreted as either a promise or a demand, depending upon the context. The definition form of the presenceKind statement is:

```
        presenceKind name {
        attribute⁺
        }
``` where *name* is the symbolic name of the presence kind being defined. The allowed attributes are:

o interface attribute (description)
    o generic attribute (description)

The presenceKind definition statement creates a named, abstract presence kind that consists of an interface and arbitrary descriptive attributes. Each presence kind must have at least one interface attribute to define its interface; additional interface attributes simply add methods to the interface. Any number of generic attributes (including none) are allowed. The presenceKind statement syntax is canonical. Its invocation form is:

```
        presenceKind name ;
```

And its anonymous form is:

```
        presenceKind {
        attribute⁺
        }
```

27

The presenceKind attribute statement associates a given presence kind with the object in which it is used as an attribute. At least for now that is only one statement:

o presenceStructure definition

The presenceStructure Statement [action]
The presenceStructure statement is used to describe the structure of a presence in terms of abstract ingredients. The presenceStructure statement is an action; that is, it describes actual presences which could be instantiated, given suitable ingredients. The definition form of the presenceStructure statement is:

```
presenceStructure name {
attribute⁺
}
``` where name is the symbolic name of the presence structure being defined. The allowed attributes are:

o presenceKind attribute (promise)
o role attribute (demand)
o deliver attribute (action)
o generic attribute (promise)

The presenceStructure definition statements creates a potential presence implementation. It must have exactly one presenceKind attribute. It also requires one deliver attribute for each method in its presence and unum interfaces.
The presenceStructure statement syntax is canonical. Its invocation form is:

presenceStructure name ;

And its anonymous form is:

```
presenceStructure {
attribute⁺
}
```

The presenceStructure attribute statement provides the corresponding presence structure to the object in which it is used as an attribute. It is used only in this statement:

o role attribute

The role Attribute Statement [demand]
A presence is composed of ingredients, each of which has a role in the presence. Analogously, an unum is composed of presences, each of which has a role in the unum. These roles are assigned with the role statement, which incorporates an ingredient or presence (by kind) into the presence or unum. The role statement is a demand.

28

The role statement, since it is only used as an attribute, has no definition form (and, consequently, no anonymous form either, since that would be meaningless). Its (non-canonical syntax) form is:

role *name kind* where *name* is the name by which the ingredient or presence will be known within the scope of the presence or unum, and *kind* is what sort of ingredient or presence it is, expressed as one of the attribute forms of an ingredientKind or presenceStructure statement. There must be one role attribute statement for each ingredient in the presence or presence in the unum.

The <u>role attribute statement</u> is used in these statements:

o presenceStructure definition
o unumStructure definition

The deliver Attribute Statement [action]

Presences and una are made from ingredients; in particular, messages sent to presences and una are delivered to ingredients. The <u>deliver statement</u> specifies how these messages are to be routed. The deliver statement is an action; that is, it describes the way an actual presence will be put together by the cyberspace agency runtime.

The deliver statement, since it is only used as an attribute, has no definition form (and, consequently, no anonymous form either, since that would be meaningless). Its (non-canonical syntax) form is:

deliver *scope what* << to *role* <<*receiver*>>>;

where *scope* is either "presence" or "unum", indicating which sort of message we are talking about delivering, *what* is the name of the message or interface being delivered, *role* is the name of the role of the ingredient to which it should be delivered, and *receiver* is the name of the method or interface to which it should be delivered (which must be a type match for *what*). If *receiver* is omitted, it is assumed to be the same as *what*. If *role* is also omitted, then Pluribus infers the ingredient by looking through all the ingredients for one with a method or interface with the same name as *receiver*; in such a case it is an error for there to be more than one possible match. Furthermore, a statement of the form:

deliver *scope* default << to *role*>>;

delivers all messages to *scope* whose delivery is not otherwise explicitly indicated as if you had written deliver *scope what* << to *role*>>;

for each such message.

29

The <u>deliver attribute statement</u> is only used in one statement:

o presenceStructure definition

The presenceImpl Statement [action]
 The <u>presenceImpl statement</u> is used to describe presence implementations. The presenceImpl statement is an action; that is, it describes how actual presences will be instantiated by the cyberspace agency runtime. The definition form of the presenceImpl statement is:

```
presenceImpl name {
attribute⁺
}
``` where *name* is the symbolic name of the presence implementation being defined. The allowed attributes are:

o fill attribute (action)
 o template attribute (action)
 o generic attribute (promise)

The <u>presenceImpl definition statement</u> creates an actual presence implementation. It must have at least one fill attribute and it must have sufficient template attributes for all the ingredient roles in its structure. It may have any number of generic attributes (possibly none).
 The presenceImpl statement is canonical. Its invocation form is:

```
presenceImpl name ;
```

And its anonymous form is:

```
presenceImpl {
attribute⁺
}
```

The <u>presenceImpl attribute statement</u> provides the corresponding implementation to the object in which it is used as an attribute. It is used in these statements:

o unumImpl definition
 o prime attribute

The template Statement [action]
 Each ingredient that is put into a presence implementation is described by a <u>template statement</u> that specifies how to instantiate the ingredient. The template statement is an action; that is, it describes the actual relationship of an ingredient implementation to the presence in which it is embedded.
 The definition form of the template statement is:

```
               template name {
               attribute⁺
               }
``` where *name* is the symbolic name of the template being defined.
The allowed attributes are:

- fill attribute (action)
- ingredientImpl attribute (action)
- map attribute (action)
- init attribute (action)
- stateInit attribute (action)

The *template definition statement* creates an actual template object which may be incorporated into presences. It must have exactly one ingredientImpl attribute, but may have any number of the other attributes. However, all the templates in a presence implementation must collectively provide the proper fill attributes for the presence structure's defined roles, proper map attributes for all inter-ingredient messages, and proper stateInit attributes for the presence's state bundles. The template statement is canonical. Its invocation form is:

```
               template name ;
```

And its anonymous form is:

```
               template {
               attribute⁺
               }
```

The *template attribute statement* actually inserts the corresponding template into a presence. It is only used in one statement:

- presenceImpl definition

The fill Attribute Statement [action]

A presence structure establishes roles for the various ingredients from which the presence is (abstractly) composed. Similarly, an unum structure establishes roles for the various presences from which the unum is composed. The *fill statement* assigns actual ingredient implementations or presence structures to those roles. The fill statement is an action; that is, it actually places ingredients or presences in particular roles in a presence or unum instance.

The fill statement, since it is only used as an attribute, has no definition form (and, consequently, no anonymous form either, since that would be meaningless). Its (non-canonical syntax) form is:

```
               fill name ;
``` where *name* is the previously defined name of the role the
ingredient implementation or presence structure with which the
fill attribute is associated is to be assigned.
   The fill attribute statement is used in these
statements:

o template attribute
   o presenceImpl definition

The map Attribute Statement [action]
   Ingredient roles and state bundles are known by one
set of names within any particular ingredient and by a
possibly different set of names in other ingredients. In
order to have allow references to these to be correctly
associated across ingredients, name mapping is required. The
map statement does this. The map statement is an action; that
is, it describes an actual association between names in
different contexts within a presence. The map statement,
since it is only used as an attribute, has no definition form
(and, consequently, no anonymous form either). Its (non-
canonical syntax) form is:

map <<*scope*>> *fromname* <<to *toname*>>;

where *scope* is either neighbor or state, indicating which sort
of name we are talking about mapping (the role name of a
neighbor ingredient or the name of a state bundle,
respectively), *fromname* is the name as it is known in the
presence, and *toname* is the name as it is known in the
ingredient whose template this map attribute is contained by.
If *toname* is omitted, it is assumed to be the same as *fromname*
(i.e., an identity mapping is used). If *scope* is omitted,
Pluribus infers the scope by looking for *fromname* among both
the neighbor role names and the state bundle names in the
presence; in such a case it is an error for the same name to
be used in both places. Furthermore, an attribute of the
form:

map <<*scope*>> default ;

maps all names in *scope* whose mapping is not otherwise
explicitly indicated as if the statement map <<*scope*>> *fromname* ;

was used for each such name.

The map attribute statement is only used in one
statement:

o template attribute

The init Attribute Statement [action]
   Ingredients may have an initialization method which
is invoked when the ingredient is instantiated. An init statement allows a template to specify the parameters to this
method. The init statement is an action; that is, it
specifies actual parameters to actually initialize an
ingredient instance. The init statement, since it is only
used as an attribute, has no definition form (and,
consequently, no anonymous form either). Its (non-canonical
syntax) form is:

init *value* <<, *value*>>* ;

where the *values* are the parameters to pass to the
initialization method. Each *value* should be a constant
expression. The <u>init attribute statement</u> is only used in one
statement:

o template attribute

The stateInit Attribute Statement [action]
        The variables in an ingredient's state bundles also
may be initialized. This is accomplished by the <u>stateInit
statement</u>. The stateInit statement is an action; that is, it
specifies actual initialization values to actually initialize
a state bundle. The stateInit statement, since it is only
used as an attribute, has no definition form (and,
consequently, no anonymous form either). Its (non-canonical
syntax) form is:

stateInit *name* {
        *initializer**
        } where *name* is the name of the state bundle and each
*initializer* sets one of the variables in the bundle with a
statement of the form:

*varname* = *value* ;

where *varname* is the variable's name and *value* is a constant
expression containing the value to initialize the variable to.

The <u>stateInit attribute statement</u> is only used in
one statement:

o template attribute

The unumKind Statement [description]
        The <u>unumKind statement</u> is used to describe unum
kinds. The unumKind statement is a pure description; that is,
it may be interpreted as either a promise or a demand,
depending upon the context. The definition form of the
unumKind statement is:

unumKind *name* {
        *attribute*$^+$
        } where *name* is the symbolic name of the unum kind being
defined. The allowed attributes are:

o interface attribute (description)
        o generic attribute (description)

The <u>unumKind definition statement</u> creates a named,
abstract unum kind that comprises an interface and arbitrary
descriptive attributes. Each unum kind must have at least one
interface attribute to define its interface; additional
interface attributes simply add methods to the interface. Any
number of generic attributes (including none) are allowed.
The unumKind statement syntax is canonical. Its invocation
form is:

unumKind *name* ;

And its anonymous form is:

unumKind {
        *attribute*⁺
        }

The <u>unumKind attribute statement</u> associates a given
unum kind with the object in which it is used as an attribute.
It is used in this statement:

o unumStructure definition

The unumStructure Statement [action]
The <u>unumStructure statement</u> is used to describe the
structure of an unum in terms of abstract presences. The
unumStructure statement is an action; that is, it describes
actual una which could be instantiated, given suitable
presences. The definition form of the unumStructure statement
is:

unumStructure *name* {
        *attribute*⁺
        } where *name* is the symbolic name of the unum structure being
defined. The allowed attributes are:

o unumKind attribute (promise)
        o role attribute (demand)
        o generic attribute (promise)

The unumStructure definition statements creates a
potential unum implementation. It must have exactly one
unumKind attribute. The unumStructure statement syntax is
canonical. Its invocation form is:

unumStructure *name* ;

And its anonymous form is:

34
            unumStructure {
            attribute⁺
            }

The unumStructure attribute statement provides the
corresponding unum structure to the object in which it is used
as an attribute. It is used only in this statement:

o unumImpl definition

The unumImpl Statement [action]
        The actual implementation of an unum is specified
using the unumImpl statement. The unumImpl statement is an
action; that is, it describes actual objects which may be
instantiated and is qualified with promises and demands which
determine the circumstances under which it may be used. The
definition form of the unumImpl statement is:

unumImpl name {
            attribute⁺
            } where name is the symbolic name of the unum implementation
being defined. The allowed attributes are:

o generic attribute (promise)
            o unumStructure attribute (promise)
            o presenceImpl attribute (action)
            o prime attribute (action)

The unumImpl definition statement creates an actual
unum implementation. It must have exactly one unumStructure
attribute and one prime attribute but can have any number of
presenceImpl and generic attributes. The unumImpl statement
syntax is canonical. Its invocation form is:

unumImpl name ;

And its anonymous form is:

unumImpl {
            attribute⁺
            }

The unumImpl attribute statement generates unum
instances.

The prime Attribute Statement [action]
        Of all the presences which compose an unum, one is
considered to be the prime presence. This is the one that
will be instantiated initially when the unum is instantiated.
The prime presence of an unum implementation is denoted by a
prime statement. The prime statement is an action; that is,
it denotes an actual presence to instantiate upon unum
creation.

35

The prime statement, since it is only used as an
attribute, has no definition form (and, consequently, no
anonymous form either, since that would be meaningless). Its
(non-canonical syntax) form is:

prime *presenceimpl* where *presenceimpl* is a presenceImpl attribute, as described
above.

The prime attribute statement is only used in one
statement:

o unumImpl definition

What is claimed is:

1. A data processing system comprising:

at least first and second data processing presences, each of said at least first and second data processing presences being associated with a particular unum and each of said first and second data processing presences including a presence interface;

at least a single unum distributed at least in part over said at least first and second data processing presences, each of said at least a single unum including an unum interface; and a plurality of ingredients associated with selected ones of said at least first and second data processing presences;

each of said at least a single unum, each of said at least first and second data processing presences, and each of said plurality of ingredients, having an interface including attributes and methods, and each of said presence interfaces and said unum interfaces acting as a trust boundary.

2. The data processing system according to claim 1, wherein said plurality of ingredients includes non-interface ingredients and interface ingredients, each of said non-interface ingredients adapted for communication with others of said non-interface ingredients, and each of said interface ingredients being adapted for mapping messages across unums and data processing presences.

3. A distributed computing system comprising:

a plurality of agencies, wherein an agency is a computing environment enclosed in an agency trust boundary within which computing resources and code are assumed by the enclosed agency to be reliable and trusted;

a plurality of distributed objects, wherein each distributed object maintains state information and code for implementing the functionality of the distributed object and includes an interface for handling messages passing across an object boundary;

a plurality of presences, wherein a presence is a container on a particular agency of the plurality of agencies for containing an instance of one or more of the distributed objects, each presence including a presence interface for handling messages passing across a presence boundary;

a plurality of unums, wherein an unum is a collection of the presences of a particular distributed object;

a messaging system that provides interface references to control message flow between ingredients within an agency boundary, between ingredients within a presence boundary and between presences within the unum boundary.

4. In a distributed computing system coupling distributed objects executing over a plurality of agencies, an agency being a computing platform secured within an agency trust boundary and interconnected to other agencies across the agency trust boundary, a method of securing execution of objects on agencies, wherein objects are not necessarily trusted by agencies that execute those objects and agencies are not necessarily trusted by the objects executed on those agencies, a method of securing mutually controllable execution of the objects on the agencies comprising the steps of:

instantiating a plurality of instances of ingredients, wherein an instance of an ingredient is an executable object containing state information that maintains a state of the instance, method code that encode for the functions performed by the instance and an instance interface for passing messages to and from the instance;

associating each instance with an agency, wherein the associated agency is the computing platform on which the instance is executed;

associating each instance with a presence, wherein a presence is a logical association of mutually trusted instances on one agency;

associating each presence with a unum, a unum being a logical association of presences associating instances of common ingredients, wherein each instance of a common ingredient is instantiated on an agency associated with a presence of the unum; and controlling message flow between instances of ingredients such that a message from a first instance of a first ingredient executing on a first agency to an instance of a second ingredient executing on a second agency passes through at least an ingredient interface between the first instance of the first ingredient and a second instance of the first ingredient, wherein the second instance of the first ingredient is executing on the second agency the first and second instances are associated with a common unum, and an interface between the second instance of the first ingredient and the instance of the second ingredient, wherein that interface is an intrapresence interface when the first and second ingredients share a common presence on the second agency and that interface is an interpresence interface when the first and second ingredients do not share a common presence on the second agency.

5. The method of claim 4, wherein the step of controlling message flow comprising the steps of:

limiting messages to an instance of an ingredient to messages that contain a reference to that instance; and limiting messages to a presence to messages that contain a reference to that presence, wherein the references are unforgeable references, an unforgeable reference being a reference to an object that cannot be generated without an authorization originated from a creator of the object using less than a threshold amount of computing effort.

6. The method of claim 4, wherein the target recipient of a message from a sending ingredient within a presence in an agency is one of an ingredient within the sending ingredient's presence, an unum within the agency, or a presence on another agency but within the sending ingredient's unum.

7. The method of claim 4, wherein messages to an unum target recipient comply with an unum interface, messages to a presence target recipient comply with a presence interface, and messages to an ingredient target recipient comply with an ingredient interface.

8. The method of claim 5, wherein said reference is a revocable reference, the method further comprising:

determining if a message passed to an interface is a nonconforming message in that the message fails to conform to a predetermined set of rules for the interface; and revoking the reference to an object to which the nonconforming message is directed.

* * * * *